(12) United States Patent
Jahana et al.

(10) Patent No.: US 12,478,928 B2
(45) Date of Patent: Nov. 25, 2025

(54) ULTRAFINE BUBBLE GENERATOR AND ULTRAFINE BUBBLE GENERATION METHOD

(71) Applicant: SARAYA CO., LTD., Osaka (JP)

(72) Inventors: Yoshifumi Jahana, Kashiwara (JP); Wataru Kumano, Kashiwara (JP); Michiaki Araki, Kashiwara (JP); Yuka Oda, Kashiwara (JP); Emiko Kawamukai, Kashiwara (JP); Yoshihiko Hirata, Kashiwara (JP)

(73) Assignee: SARAYA CO., LTD., Osaka (JP)

( * ) Notice: Subject to any disclaimer, the term of this patent is extended or adjusted under 35 U.S.C. 154(b) by 448 days.

(21) Appl. No.: 17/789,454

(22) PCT Filed: Dec. 25, 2020

(86) PCT No.: PCT/JP2020/049043
§ 371 (c)(1),
(2) Date: Aug. 24, 2022

(87) PCT Pub. No.: WO2021/132701
PCT Pub. Date: Jul. 1, 2021

(65) Prior Publication Data
US 2023/0056021 A1 Feb. 23, 2023

(30) Foreign Application Priority Data
Dec. 27, 2019 (JP) .................. 2019-239873

(51) Int. Cl.
| | | |
|---|---|---|
| *B01F 23/2373* | (2022.01) | |
| *B01F 23/232* | (2022.01) | |
| *B01F 23/237* | (2022.01) | |
| *C07H 15/04* | (2006.01) | |

(52) U.S. Cl.
CPC ........ *B01F 23/2373* (2022.01); *B01F 23/232* (2022.01); *B01F 23/237612* (2022.01); *B01F 23/23762* (2022.01); *B01F 23/23763* (2022.01); *B01F 23/23764* (2022.01); *C07H 15/04* (2013.01)

(58) Field of Classification Search
CPC ............ B01F 23/2373; B01F 23/23762; B01F 23/237612; B01F 23/23763; B01F 23/23764; B01F 23/232; C07H 15/04
See application file for complete search history.

(56) References Cited

U.S. PATENT DOCUMENTS

| | | | |
|---|---|---|---|
| 9,271,908 B2 | 3/2016 | Allef et al. | |
| 10,287,615 B2* | 5/2019 | Develter | C12P 7/64 |
| 11,312,928 B2* | 4/2022 | Okada | C11D 3/22 |
| 11,572,578 B2 | 2/2023 | Kato et al. | |
| 2015/0010604 A1 | 1/2015 | Ishii et al. | |
| 2018/0023040 A1 | 1/2018 | Schilling et al. | |
| 2019/0329199 A1 | 10/2019 | Sugano et al. | |
| 2020/0375802 A1 | 12/2020 | Metcalf et al. | |
| 2021/0262002 A1 | 8/2021 | Kato et al. | |

FOREIGN PATENT DOCUMENTS

| | | |
|---|---|---|
| CN | 109628076 A | 4/2019 |
| CN | 109705990 A | 5/2019 |
| CN | 110382676 A | 10/2019 |
| EP | 3594318 A1 | 1/2020 |
| JP | 2013-049036 A | 3/2013 |
| JP | 2013-180956 A | 9/2013 |
| JP | 2015-071550 A | 4/2015 |
| JP | 2016-123925 A | 7/2016 |
| JP | 2016-160244 A | 9/2016 |
| JP | 2016-160264 A | 9/2016 |
| JP | 2017-087128 A | 5/2017 |
| JP | 2018-164898 A | 10/2018 |
| JP | 2019-214536 A | 12/2019 |
| WO | WO 2018/097019 A1 | 5/2018 |
| WO | WO 2020/027192 A1 | 2/2020 |
| WO | WO 2022/260090 A1 | 12/2022 |

OTHER PUBLICATIONS

China National Intellectual Property Administration, Office Action in Chinese Patent Application No. 202080097126.9 (Aug. 31, 2023).
Japan Patent Office, International Search Report in International Patent Application No. PCT/JP2022/023146 (Aug. 30, 2022).
Leaper et al., "Extending the Time Concept: What Have We Learned in the Past 10 Years?," *Int. Wound J.*, 9(Suppl 2): 1-19 (2012).
Lydon et al., "Adjuvant Antibiotic Activity of Acidic Sophorolipids with Potential for Facilitating Wound Healing," *Antimicrob. Agents Chemother.*, 61(5); e02547-16 (2017).
Meng et al., "Inhibition of Ethylenediaminetetraacetic acid (EDTA) on Biofilm Formation of *Staphylococcus aureus*," *Food Sci. Technol. Res.*, 19(2): 323-330 (2013).
Nakagami et al., "Innovation of Wound Care by Visualizing Biofilms," *Japanese Journal of Foot Care*, 16(1): 1-6 (2018).
Nakagami et al., "Visualizing Biofilms," *Visual Dermatology*, 17(2): 156-159 (2018).
Nakagami, "New Wound Care Utilizing Biofilm Detection Technology That Can Be Performed at the Bedside," *Japanese Society for Wound Healing Newsletter*, May 2018: 105 (2018).
Schultz et al., "Consensus Guidelines for the Identification and Treatment of Biofilms in Chronic Nonhealing Wounds," *Wound Repair Regen.*, 25(5): 744-757 (2017).

(Continued)

*Primary Examiner* — Charles S Bushey
(74) *Attorney, Agent, or Firm* — Leydig, Voit & Mayer, Ltd.

(57) ABSTRACT

The invention relates to an ultrafine bubble (UFB) generator and a method for generating UFB. The invention also provides an ultrafine bubble-containing liquid and a production method of the liquid. An ultrafine bubble generator is prepared by combining (A) a sophorolipid containing acidic sophorolipid and lactonic sophorolipid in a ratio (mass ratio) of 78:22 to 100:0, (B) a free fatty acid or salt thereof, and (C) a gas generation component.

6 Claims, 1 Drawing Sheet

(56) References Cited

OTHER PUBLICATIONS

Shiroodi et al., "Efficacy of Nanobubbles Alone or in Combination with Neutral Electrolyzed Water in Removing *Escherichia coli* O157:H7, *Vibrio parahaemolyticus*, and *Listeria innocua* Biofilms," *Food and Bioprocess Technology*, 14: 287-297 (2021).

The Japanese Society of Pressure Ulcers, *Revised DESIGN-R®2020 Consensus Document* (2020).

Wolcott et al., "Biofilm Maturity Studies Indicate Sharp Debridement Opens a Time-Dependent Therapeutic Window," *J. Wound Care.*, 19(8): 320-328 (2010).

Yamada et al., "Effect of Ultrafine Bubbles on *Pseudomonas aeruginosa* and *Staphylococcus aureus* During Sterilization of Matching Fluid," *Int. J. Autom. Technol.*, 15(1): 99-108 (2021).

Arai, "The Accelerating Industrialization of Fine Bubble Technology," *ARC Report RS-1007* (2016) [https://arc.asahi-kasei.co.jp/report/arc_report/pdf/rs-1007.pdf].

Japan Patent Office, International Search Report in International Patent Application PCT/JP2020/049043 (Mar. 16, 2021).

European Patent Office, Extended European Search Report in European Patent Application No. 22820269.3 (May 16, 2025).

* cited by examiner

ULTRAFINE BUBBLE GENERATOR AND ULTRAFINE BUBBLE GENERATION METHOD

TECHNICAL FIELD

The present invention relates to an ultrafine bubble generator and a method for generating ultrafine bubbles. The present invention also relates to an ultrafine bubble-containing liquid and a production method of the liquid.

BACKGROUND ART

Fine bubbles, which have a diameter of 100 μm or less, have cleaning, catalytic, disinfecting and sterilizing, deodorizing, particulate adsorption, biological activation, and friction reduction effects. Using such effects, fine bubbles are used in many fields. Specifically, for example, fine bubbles are used in many places, such as for water purification and improvement in the living environment by supplying oxygen gas to closed water areas such as lakes and marshes in the environmental field; for wastewater and waste liquid treatment, improvement in cleaning and combustion, and separation treatment in the industrial field; for sterilization, cleaning, and freshness preservation of food in the food field; for plant growth by the application of fine bubbles to agricultural water and hydroponics in the agricultural field; for cultivation and freshness preservation in the fishery field; for diagnosis of diseases by introduction into a contrast agent or application into medicines in the medical field; and for relaxation by application to baths in the beauty field (see, for example, Non-patent Literature 1).

Among fine bubbles, ultrafine bubbles with a diameter of less than 1 μm are referred to as "ultrafine bubbles" according to the International Organization for Standardization (ISO) standards. Ultrafine bubbles are different from microbubbles having a diameter of 1 μm or more in that they are retained (retention) in water for a long period of time. Ultrafine bubbles also have high cleaning power without the use of a detergent or chemical, due to their properties of having electrical charge. For this reason, the application of fine bubbles in the cleaning field, such as for washing toilets in highway rest areas, removing salt from bridges and other structures, and cleaning in finishing of resin products is already at the practical stage. Washing machines utilizing ultrafine bubbles have also been launched. Furthermore, the high-performance catalytic effects, sterilizing and disinfecting effects, etc., of ultrafine bubbles are expected to be applied in the medical and pharmaceutical fields, as well as in the food and drinking water fields (Non-patent Literature 1 or the like).

Ultrafine bubbles are typically generated using a bubble generation device. There is a method for generating fine bubbles by jetting gas from small pores into a liquid to which a surfactant has been added (surfactant-added microporous method), a method for generating fine bubbles by pressurizing and dissolving gas (pressurized dissolution method), or a method for generating bubbles by swirling or shearing gas (swirl and shear method). In contrast, as a method for generating bubbles without the use of equipment, a method for generating bubbles by combining carbonate and acid is known. Bath additives and like products using this principle are also available; however, bubbles generated from these formulations are called "microbubbles" or "millibubbles" (see, for example, Patent Literature 1). In addition, microbubble generation accelerators for promoting the generation of fine bubbles that correspond to ultrafine bubbles have been proposed (Patent literature 2 and 3); however, both are used by supplying them to a bubble generation device, and these documents do not propose a method for generating bubbles without using equipment.

PATENT LITERATURE

PTL 1: JP2015-071550
PTL 2: JP2016-123925
PTL 3: WO2018/097019

NON-PATENT LITERATURE

NPL 1: Yoshihiro ARAI, "The accelerating industrialization of fine bubble technology," ARC Report, November 2016. https://arc.asahi-kasei.co.jp/report/arc_report/pdf/rs-1007.pdf

SUMMARY OF INVENTION

Technical Problem

As explained above, a method for generating fine bubbles that correspond to ultrafine bubbles, without using a bubble generation device has not been known. Accordingly, an object of the present invention is to provide an ultrafine bubble generator capable of generating fine bubbles corresponding to ultrafine bubbles.

The present invention also aims to provide a method for generating ultrafine bubbles. Furthermore, the present invention aims to provide an ultrafine bubble-containing liquid and a production method of the liquid.

Solution to Problem

The present inventors made extensive research to solve the above problem and found that fine bubbles corresponding to ultrafine bubbles can be generated in water by using (a) a sophorolipid containing acidic sophorolipid and lactonic sophorolipid in a mass ratio of 78:22 to 100:0, and (b) a fatty acid or salt thereof, in addition to a gas generation component.

The present invention was accomplished as a result of further research based on these findings, and includes the following embodiments.

Fine bubbles corresponding to ultrafine bubbles and a sophorolipid may be sometimes abbreviated below as "UFBs" and "SL," respectively.

(I) UFB Generator
(I-1)
A UFB generator comprising a combination of the following (A), (B), and (C):
  (A) an SL containing acidic SL and lactonic SL in a ratio (mass ratio) of 78:22 to 100:0,
  (B) a free fatty acid or salt thereof, and
  (C) a gas generation component.
(I-2)
The UFB generator according to Item (I-1), wherein (C) is at least one member selected from the group consisting of carbon dioxide gas generation components, oxygen gas generation components, hydrogen gas generation components, and chlorine gas generation components.
(I-3)
The UFB generator according to Item (I-2), wherein the carbon dioxide gas generation component is a carbonate or hydrogen carbonate, or a combination with its counterpart;

the oxygen gas generation component is a hydrogen peroxide or a combination with its counterpart; the hydrogen gas generation component is a hydrogenated salt, boron hydrogenated salt, or hydrochloric acid, or a combination with its counterpart; or the chlorine gas generation component is a hypochlorite or a combination with its counterpart.

(I-4)
The UFB generator according to any one of Items (I-1) to (I-3), wherein the free fatty acid (B) is a fatty acid having 12 to 20 carbon atoms.

(I-5)
The UFB generator according to any one of Items (I-1) to (I-4), which is a composition of (A), (B), and (C) or a product combination in which at least (C) is packaged separately from (A) and (B).

(I-6)
The UFB generator according to any one of Items (I-1) to (I-5), which is used when added to water with a hardness of 30 to 200 mg/L and preferably 50 to 200 mg/L.

(I-7)
The UFB generator according to Item (1-6), wherein (A) and (B) are used so that the concentration of (A) is 0.005 mass % or more, and preferably 0.005 to 0.04 mass %, and the concentration of (B) is 0.0001 mass % or more, and preferably 0.0001 to 0.3 mass %, relative to water.

(I-8)
The UFB generator according to Item (I-7), wherein (C) is used so that the concentration of (C) as the concentration of a gas generation body is 0.1 mass % or more, and preferably 0.1 to 20 mass %; relative to water.

(I-9)
The UFB generator according to any one of Items (I-1) to (I-8), which generates fine bubbles having a scattering intensity of 10000 cps or more, and preferably 30000 cps or more; and an average number particle size of less than 1000 nm, and preferably 500 nm or less in water with a hardness of 30 to 200 mg/L.

(I-10)
The UFB generator according to any one of Items (I-1) to (I-9), which is a detergent, bath additive, cosmetic, mouthwash, gargle, texture improver, food or drink, plant growth promoter, seafood growth promoter, or disinfectant.

(II) UFB Generation Method (II-1)
A method for generating UFBs, comprising:
(a) the step of adding the following (A), (B), and (C) to water with a hardness of 30 to 200 mg/L, and preferably 50 to 200 mg/L, to allow these three to coexist in the water; and
(b) the step of generating fine bubbles in the water,
(A) an SL containing acidic SL and lactonic SL in a ratio (mass ratio) of 78:22 to 100:0,
(B) a free fatty acid or salt thereof, and
(C) a gas generation component.

(II-2)
The method for generating UFBs according to Item (II-1), wherein the fine bubbles generated in step (b) are fine bubbles with a scattering intensity of 10000 cps or more, and preferably 30000 cps or more; and an average number particle size of less than 1000 nm, and preferably 500 nm or less.

(II-3)
The method for generating UFBs according to Item (II-1) or (II-2), wherein (C) is at least one member selected from the group consisting of carbon dioxide gas generation components, oxygen gas generation components, hydrogen gas generation components, and chlorine gas generation components.

(II-4)
The method for generating UFBs according to Item (II-3), wherein the carbon dioxide gas generation component is a carbonate or hydrogen carbonate, or a combination with its counterpart; the oxygen gas generation component is a hydrogen peroxide or a combination with its counterpart; the hydrogen gas generation component is a hydrogenated salt, boron hydrogenated salt, or hydrochloric acid, or a combination with its counterpart; or the chlorine gas generation component is a hypochlorite or a combination with its counterpart.

(II-5)
The method for generating UFBs according to Items (II-1) to (II-4), wherein (A) and (B) are added to the water so that the concentration of (A) and the concentration of (B) in the water are respectively 0.005 mass % or more, and preferably 0.005 to 0.4 mass %, and 0.0001 mass % % or more, and preferably 0.0001 to 0.3 mass % in step (a).

(II-6)
The method for generating UFBs according to Items (II-4) to (II-5), wherein (C) is added to the water so that the concentration of (C) as the concentration of a gas generation body in the water is 0.1 mass % or more, and preferably 0.1 to 20 mass % in step (a).

(II-7)
The method for generating UFBs according to any one of Items (II-1) to (II-6), wherein step (b) is a step of generating fine bubbles in water without introducing gas from outside.

(III) UFB-Containing Liquid (III-1)
A UFB-containing liquid, comprising the following (A), (B), (c), and (d):
(A) an SL containing acidic SL and lactonic SL in a ratio (mass ratio) of 78:22 to 100:0,
(B) a free fatty acid or salt thereof,
(c) fine bubbles that are formed from at least one gas selected from the group consisting of carbon dioxide gas, oxygen gas, hydrogen gas, and chlorine gas, and that have an average number particle size of less than 1000 nm; and
(d) water.

(III-2)
The UFB-containing liquid according to Item (III-1), wherein the fine bubbles have an average number particle size of 500 nm or less, and a scattering intensity of 10000 cps or more, and preferably 30000 cps or more.

(III-3)
The UFB-containing liquid according to Item (III-1) or (III-2), wherein the concentration of (A) is 0.005 mass % or more, and preferably 0.005 to 0.4 mass %, and the concentration of (B) is 0.0001 mass % % or more, and preferably 0.0001 to 0.3 mass.

(III-4)
The UFB-containing liquid according to any one of Items (III-1) or (III-3), wherein (d) is water with a hardness of 30 to 200 mg/L, and preferably 50 to 200 mg/L.

(IV) Method for Producing UFB-Containing Liquid (IV-1)
A method for producing a UFB-containing liquid, comprising:
(a) the step of adding the following (A), (B), and (C) to water with a hardness of 30 to 200 mg/L, and preferably 50 to 200 mg/L to allow these three to coexist in the water; and (b) the step of generating fine bubbles in the water,
(A) an SL containing acidic SL and lactonic SL in a ratio (mass ratio) of 78:22 to 100:0,
(B) a free fatty acid or salt thereof, and
(C) a gas generation component.

(IV-2)

The production method according to Item (IV-1), wherein the fine bubbles generated in step (b) are fine bubbles having a scattering intensity of 10000 cps or more, and preferably 30000 cps or more; and an average number particle size of less than 1000 nm, and preferably 500 nm or less.

(IV-3)

The production method according to Item (IV-1) or (IV-2), wherein (C) is at least one member selected from the group consisting of carbon dioxide gas generation components, oxygen gas generation components, hydrogen gas generation components, and chlorine gas generation components.

(IV-4)

The production method according to Item (IV-3), wherein the carbon dioxide gas generation component is a carbonate or hydrogen carbonate, or a combination with its counterpart; the oxygen gas generation component is a hydrogen peroxide or a combination with its counterpart; the hydrogen gas generation component is a hydrogenated salt, boron hydrogenated salt, or hydrochloric acid, or a combination with its counterpart; or the chlorine gas generation component is a hypochlorite or a combination with its counterpart.

(IV-5)

The production method according to Items (IV-1) to (IV-4), wherein (A) and (B) are added to the water so that the concentration of (A) and the concentration of (B) in the water are respectively 0.005 mass %, or more, and preferably 0.005 to 0.4 mass %, and 0.0001 mass % or more, and preferably 0.0001 to 0.3 mass % in step (a).

(IV-6)

The production method according to Item (IV-4) or (IV-5), wherein (C) is added to the water so that the concentration of (C) as the concentration of a gas generation body in the water is 0.1 mass % or more, and preferably 0.1 to 20 mass % in step (a).

(IV-7)

The production method according to any one of Items (IV-1) to (IV-6), wherein step (b) is a step of generating fine bubbles in water without introducing gas from outside.

Advantageous Effects of Invention

According to the UFB generator and UFB generation method of the present invention, UFBs can be generated in water without using a bubble generation device. According to the UFB generation method and the method for producing a UFB-containing liquid of the present invention, a UFB-containing liquid can be produced and obtained without using a bubble generation device.

Since the thus-obtained UFB-containing liquid has fine bubbles having an average number particle size of less than 1000 nm in the liquid, effects caused by ultrafine bubbles can be achieved over a relatively long period of time.

-■-: SL-containing composition 1,
-△-: sodium alkyl polyoxyethylene sulfate,
-◇-: dimethyldidecylammonium chloride,
-◆-: benzalkonium chloride,
-×-: lauryl dimethylaminoacetic acid betaine,
-+-: lauryl dimethylamine oxide,
-●-: POE lauryl ether, and
-○-: POE stearyl ether (6EO).

Figure 2:
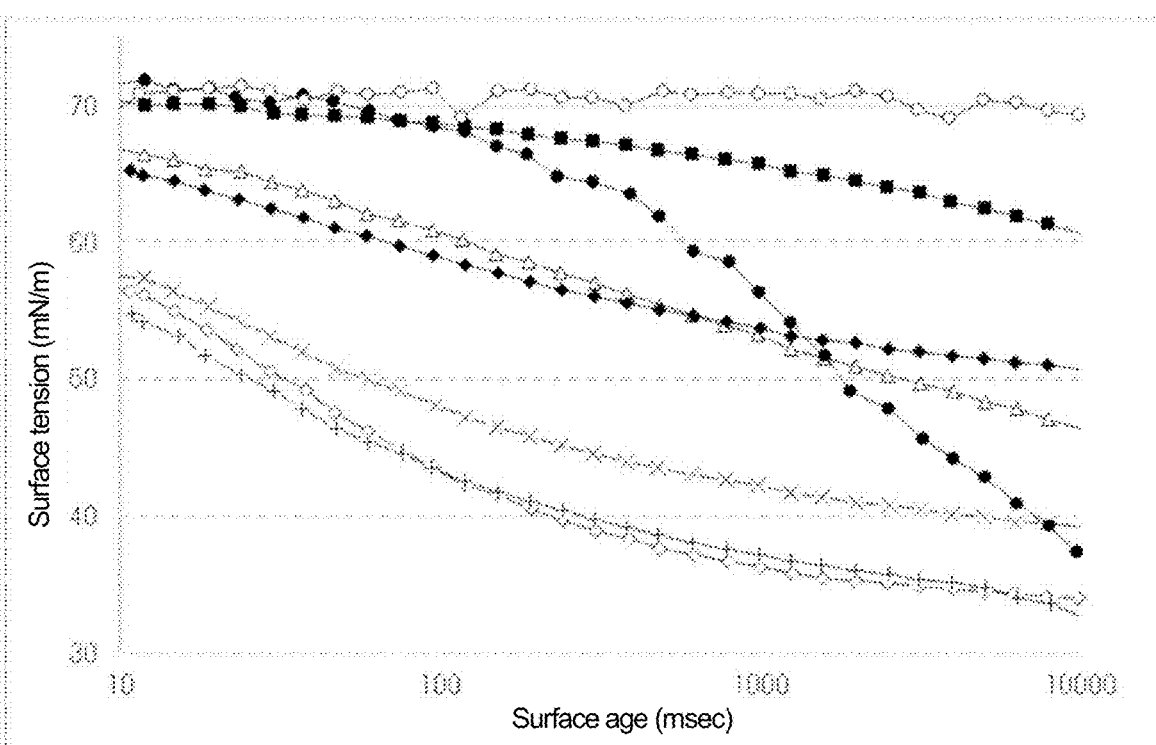

FIG. 2 shows the results of Experimental Example 13, which was performed with a surfactant concentration of 0.05 mass.

DESCRIPTION OF EMBODIMENTS

Definition and Measurement Method of UFB

Ultrafine bubbles are defined as bubbles with a bubble size of less than 1 μm (ISO 20480-1:2017 Fine bubble technology).

UFBs, which are the target of the present invention, are fine bubbles with the bubble size mentioned above. The bubble size of the fine bubbles can be measured using a measuring instrument based on the principle of dynamic light scattering (dynamic light scattering spectrophotometer). Specifically, when the particle size of bubbles contained in a test sample (liquid) is measured, if the average number particle size is less than 1000 nm, the test sample can be determined to contain UFBs. The average number particle size of UFBs may be less than 1000 nm, and the lower limit is not particularly limited. UFBs can be categorized into fine bubbles with an average number particle size of 50 nm to less than 200 nm, fine bubbles with an average number particle size of 200 nm to less than 500 nm, and fine bubbles with an average number particle size of 500 nm to less than 1000 nm. UFBs are preferably fine bubbles with an average number particle size of 500 nm or less. These samples (liquids) can be used in various fields (such as environmental, industrial, agricultural, fishery, medical and pharmaceutical, cosmetic, food and beverage fields) according to the function based on the bubble size. Below, the terms "particle size" or "bubble size" in the present specification indicate the average number particle size.

In order for the liquid containing fine bubbles (UFBs) having a bubble size of less than 1000 nm to effectively exhibit its function, it is preferable that the UFBs are contained in the liquid in the predetermined concentration ratio. UFBs in the liquid make a particle size-dependent Brownian motion. Accordingly, by the irradiation of a UFB-containing liquid with laser light (He—Ne mode) to detect the emitted scattered light with a dynamic light scattering spectrophotometer, the scattering intensity, which depends on the Brownian motion of the UFB particles, can be measured. The ratio (concentration) of UFBs in the liquid can therefore be evaluated by measuring the scattering intensity (cps) of the UFBs in the UFB-containing liquid. The specific measurement method and conditions are as described in Experimental Example 1. As described below, the scattering intensity of the UFBs in the UFB-containing liquid can be evaluated by subtracting the scattering intensity of particles other than UFBs from the scattering intensity of the UFB-containing liquid. The scattering intensity of UFBs is not limited, and is preferably 5000 cps or more, more preferably 10000 cps or more, and particularly preferably 30000 cps or more. The scattering intensity of UFBs is not particularly limited as long as the upper limit of the scattering intensity of UFBs is 100000000 cps.

From the scattered light obtained by the above method, the autocorrelation function using the photon correlation method is obtained. The diffusion coefficient, which indicates the Brownian motion velocity, as well as the particle size and particle size distribution, can be obtained by using cumulant analysis and histogrammatic analysis. In the present invention, the UFB particle size can be measured and evaluated according to the method and conditions shown in Experimental Example 1 below.

Unlike millibubbles, which quickly rise to the surface of a liquid and burst, and microbubbles, which float gently and disappear, UFBs, once formed in a liquid, are known to float and be retained for a long period of time while diffusing in the liquid through Brownian motion without rising. In the present invention as well, it is also desirable that the scattering intensity continues over a long period of time. The period of time is not limited, and can, for example, last on a daily basis, such as for one day to several days; on a monthly basis, such as for one month to several months; or a yearly basis, such as for one year to several years. Although the period of time is not limited, the target period is 6 months or more, preferably one year or more, more preferably two years or more, and particularly preferably three years or more.

In the following embodiments of the present invention, the particle size of UFBs and the scattering intensity were determined by using a dynamic light scattering spectrophotometer (DLS 6500-HL: produced by Otsuka Electronics Co., Ltd) at atmospheric pressure and room temperature (25° C.) under the following conditions.

Laser mode: He—Ne laser
Number of integrations: 400 times
Sampling time: 10 μsec
Measurement channel: 1024 ch
Measuring angle: 30°
Pinhole 1:0.5,
Pinhole 2:0.2.

(I) UFB Generator

The UFB generator of the present invention is added to a target liquid to generate UFBs in the liquid. The target liquid is not limited as long as it generates UFBs in the added UFB generator of the present invention. The target liquid is preferably an aqueous solvent. An aqueous solvent with a hardness in the range of 30 to 200 mg/L is more preferred, and an aqueous solvent with a hardness in the range of 50 to 200 mg/L is particularly preferred. Water with a hardness in this range can be suitably used.

Herein, hardness (mg/L) means American hardness (or Japanese hardness), which can be specifically determined by converting the amounts of calcium and magnesium into the amount of calcium carbonate ($CaCO_3$) according to equation 1 below.

Hardness[mg/l]=(Calcium content[mg/l]×2.5)+(Magnesium content[mg/l]×4.1)

The UFB generator comprises a combination of the following (A), (B), and (C):

(A) a sophorolipid containing acidic sophorolipid and lactonic sophorolipid in a ratio (mass ratio) of 78:22 to 100:0,
(B) a free fatty acid or salt thereof, and
(C) a gas generation component.

(A) Sophorolipid (SL)

Sophorolipid (SL) is generally a glycolipid consisting of sophorose or a sophorose whose one or more hydroxy groups are acetylated or esterified, and a hydroxy fatty acid. Sophorose is a sugar consisting of two glucose molecules bound through a β1-2 bond. Hydroxy fatty acid is a fatty acid having a hydroxy group. SL is roughly classified into acidic SL and lactonic SL. Acidic SL is a sophorolipid in which the carboxy group of the hydroxy fatty acid is free. Lactonic SL is a sophorolipid in which the carboxy group of the hydroxy fatty acid is bound to the sophorose in the molecule. Examples of acidic SL include an SL represented by formula (1) below, and examples of lactonic SL include an SL represented by formula (2) below. The SL obtained from SL-producing yeast through fermentation is usually a mixture of acidic SL and lactonic SL, and is obtained as a collection of 30 or more types of structural homologues, such as those having different fatty acid chain lengths ($R_2$), those acetylated or protonated at the 6'-position ($R_3$) and the 6"-position ($R_4$) of the sophorose, and those esterified at one of the 3'-, 4'-, 2"-, 3"-, and 4"-positions ($R_5$) of the sophorose.

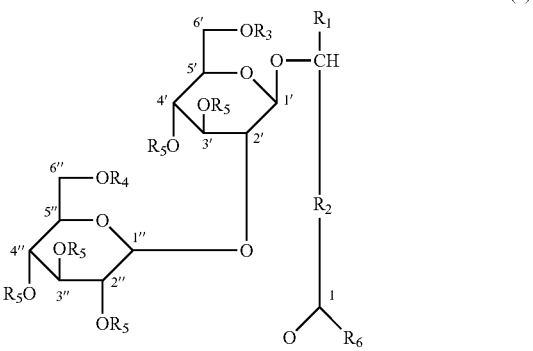

(1)

(In formula (1), $R_1$ represents a hydrogen atom or a methyl group; $R_3$ and $R_4$ are the same or different and independently represent a hydrogen atom or an acetyl group; all $R_5$ are hydrogen atoms, or one of the five $R_5$ is a saturated or unsaturated fatty acid residue that may have hydroxy, and the rest are all hydrogen atoms; $R_2$ is a saturated aliphatic hydrocarbon chain, or an unsaturated aliphatic hydrocarbon chain having at least one double bond, which may have one or more substituents; and $R_6$ is a hydroxy group).

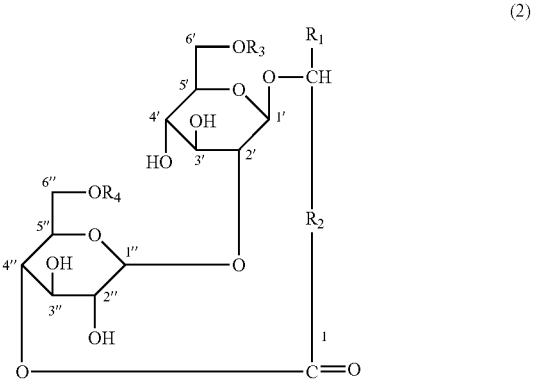

(2)

(In formula (2), $R_1$ to $R_4$ are as defined in formula (1)).

The SL targeted by the present invention may contain a dimer (dimeric SL) in which $R_6$ at the C-1 position of one of the acidic SLs represented by formula (1), which is a saturated or unsaturated fatty acid residue in which one $R_5$ group may have a hydroxy group and the rest of the four $R_5$ groups may have hydrogen atoms, is bound to one $R_7$ of acidic SL represented by formula (3) to form a single bond.

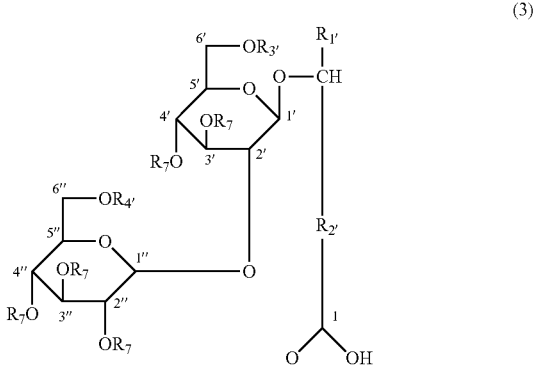

(3)

(In formula (3), $R_{1'}$ is a hydrogen atom or a methyl group; $R_{3'}$ and $R_{4'}$ are the same or different and represent a hydrogen atom or an acetyl group;

$R_{2'}$ is a saturated aliphatic hydrocarbon chain or an unsaturated aliphatic hydrocarbon chain having at least one double bond and may have one or more substituents; and one $R_7$ is bound to $R_6$ of the acidic SL represented by formula (1) to form a single bond, and the rest of the $R_7$ are all hydrogen atoms.)

In formulas (1) to (3), the number of carbons in the saturated or unsaturated aliphatic hydrocarbon chain represented by $R_2$ or $R_{2'}$ is not limited, but is usually 9 to 20, preferably 9 to 18, more preferably 11 to 16, and particularly preferably 14 to 16. The saturated aliphatic hydrocarbon chain can be, for example, a linear or branched chain alkylene group, and is preferably a linear alkylene group. Examples of the unsaturated aliphatic hydrocarbon chain include alkenylene groups having 1 to 3 double bonds. The unsaturated aliphatic hydrocarbon chain is preferably an alkenylene group having 1 to 2 double bonds, and more preferably an alkenylene group having 1 double bond. There is no limitation on the substituent of the saturated or unsaturated aliphatic hydrocarbon chain represented by $R_2$ or $R_2'$. Examples of substituents include halogen atoms, a hydroxy group, lower ($C_{1-6}$) alkyl groups, halo-lower ($C_{1-6}$ alkyl groups, hydroxy lower ($C_{1-6}$) alkyl groups, halo-lower ($C_{1-6}$) alkoxy groups, and the like. Examples of halogen atoms or halogen atoms bound to alkyl or alkoxy groups include a fluorine atom, a chlorine atom, a bromine atom, and an iodine atom.

Examples of saturated fatty acid residues represented by $R_5$ in formula (1) include $C_{12-20}$ linear fatty acid residues (lauric acid residue, myristic acid residue, pentadecylic acid residue, palmitic acid residue, margaric acid residue, stearic acid residue, and arachidic acid residue), preferably $C_{14-20}$, more preferably $C_{16-20}$, even more preferably $C_{16-28}$ linear fatty acid residues, and particularly preferably $C_{18}$ palmitic acid residue and $C_{28}$ stearic acid residue. Examples of unsaturated fatty acid residues include $C_{12-20}$ linear fatty acid residues having 1 to 3 double bonds. The number of double bonds is preferably 1 to 2 and more preferably 1. The number of carbon atoms is preferably 16 to 20, more preferably 16 to 18, and particularly preferably 18. Preferable examples of unsaturated fatty acid residues include $C_{16}$ palmitoleic acid residue having one double bond; $C_{18}$ oleic acid residue or vaccenic acid residue having one double bond (preferably oleic acid residue); $C_{18}$ linoleic acid residue having two double bonds; $C_{10}$ linolenic acid residue (9, 12, 15), linolenic acid residue (6, 9, 12), and eleostearic acid residue having three double bonds; and $C_{20}$ linolenic acid residue (9, 12, 15), linolenic acid residue (6, 9, 12), and eleostearic acid residue having two double bonds. More preferably, the unsaturated fatty acid residue is $C_{16}$ palmitoleic acid residue having one double bond and $C_{18}$ oleic acid residue having one double bond, particularly preferably a $C_{18}$ oleic acid residue having one double bond.

These fatty acid residues may have hydroxy or may not have hydroxy. When the fatty acid residues have hydroxy, the number of hydroxy is 1 or 2, and preferably 1. Further, the hydroxy may be present, for example, at the ω-position or ω-1-position in the fatty acid residue. In acidic SL (1), when $R_5$ is a saturated or unsaturated fatty acid residue that may have hydroxy, —$OR_5$ may be present at any of the 3', 4', 2", 3", and 4"-positions of the sophorose ring. More specifically, acidic SL (1) includes an SL compound in which an —$OR_5$ group having $R_5$ that is the fatty acid residue described above is present at one of these positions. More preferably, acidic SL (1) is a compound (1) in which —$OR_5$ having R that is a saturated or unsaturated fatty acid residue that may have hydroxy is present at the 4"-position of the sophorose ring.

As described above, in a liquid culture obtained through fermentation by an SL-producing yeast, SL is usually present as a mixture of acidic SL (monomeric SL shown in formula (1)) and lactonic SL (monomeric SL shown in formula (2)). Among those, since the lactonic SL is a nonionic oily substance and is extremely insoluble in water by itself, it is undesirable to have lactonic SL in a high ratio because it causes a sophorolipid mixture to be water-insoluble as a whole. On the other hand, it is preferable to have acidic SL in a high ratio because it is chemically stable as compared to lactonic SL.

Examples of preferable SL-producing yeast include *Candida bombicola*. The *Candida* genus has been renamed the *Starmerella* genus. This yeast is an SL-producing yeast known to produce a significant amount of (acidic and lactonic) SL (Canadian Journal of Chemistry, 39, 846 (1961) (note: the *Torulopsis* genus described in the document belongs to the *Candida* genus, but is currently classified into the *Starmerella* genus, as described above); Applied and Environmental Microbiology, 47, 173 (1934); etc.). *Candida* (*Starmerella*) *bombicola* has been deposited with, and is available from, the American Type Culture Collection (ATCC), which is a bioresource bank (*Candida bombicola* ATCC22214). Other SL-producing yeast that belongs to the *Candida* genus (*Starmerella* genus) and is known to produce (acidic and lactonic) SL can also be used. Examples of such SL-producing yeast include *Candida magnoliae, Candida gropengisseri, Candida apicola, Candida petrophilum, Candida bogoriensis, Candida batistae*, and the like.

The culture of such SL-producing yeast in the present invention uses a culture medium containing, as carbon sources, a sugar such as glucose (hydrophilic substrate), and fatty acid, a fatty acid ester such as fatty acid triglyceride, or oil and fat such as vegetable oil containing fatty acid as a component (hydrophobic substrate). Other components of the culture medium are not particularly limited and can be suitably selected from medium components generally used for yeast.

The SL used in the present invention refers to a composition in which acidic SL represented by formula (1) is present in a ratio of 78 mass % or more, and lactonic SL represented by formula (2) is present in a ratio of 22 masse or less, based on the total amount (100 mass) of the acidic SL and lactonic SL; preferably a composition in which acidic SL is present in a ratio of 85 mass % % or more and lactonic SL is present in a ratio of 15 mass % or less; more preferably a composition in which acidic SL is present in a ratio of 90 mass % or more and lactonic SL is present in a ratio of 10 mass % or less; and even more preferably a composition in which acidic SL is present in a ratio of 95 mass % or more and lactonic SL is present in a ratio of 5 mass % or less. The SL may be an SL free of lactonic SL, specifically, an SL in which the ratio of acidic SL is 100 mass.

The ratio of acidic SL to lactonic SL in the SL-containing composition in, for example, an SL-producing yeast culture or its processed product, can be determined by the measurement method described, for example, in WO2015/020114, the contents of which are hereby incorporated by reference. Specifically, the following method can be used: a solution prepared by mixing a mixture of acidic SL and lactonic SL (SL-containing composition) with an equal volume of a 50 volume % ethanol solution is subjected to reversed-phase column chromatography as described below, and the obtained fractions are further subjected to high-performance liquid chromatography (HPLC) to quantitatively analyze the SL content of each elution fraction.

Fractionation by Reversed-Phase Column Chromatography
(1) A solution obtained by mixing 600 g of an SL-containing composition and an equal volume of 50 volume % ethanol solution is subjected to reversed-phase column chromatography under the following conditions.
    Solid phase: $C_{18}$ column (Cosmosil $40C_{18}$-PREP, produced by Nacalai Tesque, Inc., 7.5 kg)
    Mobile phase: an aqueous ethanol solution having an ethanol concentration of 50 to 95 volume %
(2) Specifically, to the solid phase, 10 L of a 50 volume aqueous ethanol solution, 10 L of a 80 volume % aqueous ethanol solution, 15 L of a 90 volume % aqueous ethanol solution, and 15 L of a 95 volume % aqueous ethanol solution are subjected sequentially, and the fractions eluted with the 80 volume % aqueous ethanol solution, the 90% aqueous ethanol solution, and the 95% aqueous ethanol solution are collected.
(3) Each elution fraction is evaporated to dryness and then dissolved in ethanol. These solutions are used as test samples and subjected to HPLC under the following conditions.

Quantitative Analysis by HPLC
Conditions
   Device: Shimadzu Corporation LC-10 AD-VP
   Column: Inertsil ODS-3 (4.6 mm×250 mm)
   Column temperature: 40° C.
   Mobile phase: [A] distilled water,
[B] Methanol containing 0.1 volume % formic acid
   Gradients: 0 min→60 min: [B] 70→100 volume %
   60 min→70 min: [B] 100→70 volume %.
   Flow rate: 1.0 mL/min
   Sample injection volume: 10 µL
   Detector: Evaporative light scattering detector (ELSD-LTII, produced by Shimadzu Corporation)
   Detector temperature: 40° C.
   Gain: 5
   Gas pressure: 350 kpa ($N_2$ gas)

The fraction eluted with the 80 volume % aqueous ethanol solution contains acidic SL represented by the following formula (1a) among acidic SLs represented by formula (1). Among acidic SLs represented by formula (1), this type of acidic SL is an acidic SL represented by formula (1), in which all $R_5$ are a hydrogen atom. In the HPLC under the above conditions, the acidic SL (1a) elutes in a retention time zone of 10 to 25 minutes.

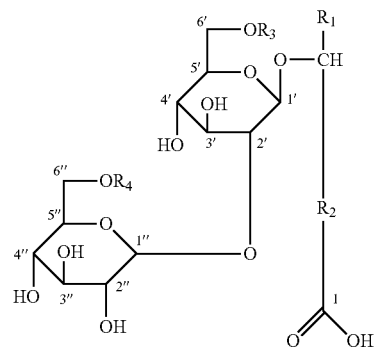

(In formula (1a), $R_1$ to $R_4$ are the same as defined in formula (1).)

The fraction eluted with the 80 volume % ethanol aqueous solution contains not only the acidic SL (1a) but also the lactonic SL represented by formula (2) above. In the HPLC under the above conditions, the lactonic SL (2) elutes in a retention time zone of 25 to 40 minutes.

The fraction eluted with the 90 volume % aqueous ethanol solution contains acidic SL (1b), which is one of the acidic SLs represented by formula (1) wherein one $R_5$ is a saturated or unsaturated fatty acid residue that may have a hydroxy group and the rest of the $R_5$ are a hydrogen atom. In the HPLC under the above conditions, the acidic SL (1b) elutes in a retention time zone of 45 to 60 minutes.

The fraction eluted with the 95 volume % ethanol solution contains dimeric SL represented by formula (3). In HPLC under the above conditions, the dimeric SL (3) elutes in a retention time zone of 60 to 70 minutes.

Thus, the ratio of acidic SL to lactonic SL contained in the SL-containing composition, specifically, the ratio of each ST based on the total amount (100 mass %) of acidic SL and lactonic SL, can be determined from the area ratio of the peaks detected in each retention time zone in HPLC under the above conditions.

The SL in the present invention is not particularly limited in form and may be in the form of a liquid, an emulsion, or a solid. Examples of the solid form include dry solids such as freeze-dried products, spray-dried products, and evaporated dried products; tablets; pills; powders; granules; and capsules. The ratio of acidic SL and lactonic SL in the UFB generator of the present invention can be suitably selected from the range of 1 to 80 mass % based on the total amount (100 mass %) of components (A), (B), and (C) as long as the effect of the present invention can be attained.

(B) Free Fatty Acid or Salt Thereof

The free fatty acid, which is a target in the present invention, may be saturated or unsaturated fatty acid as long as the effects of the present invention can be achieved. Examples of saturated fatty acid include $C_{12-20}$ fatty acid (lauric acid, myristic acid, pentadecylic acid, palmitic acid, margaric acid, stearic acid, and arachidic acid), preferably $C_{14-20}$, more preferably $C_{16-20}$, even more preferably $C_{16-28}$ fatty acid, and particularly preferably $C_{16}$ palmitic acid. Examples of unsaturated fatty acid include $C_{12-20}$ fatty acid having 1 to 3 double bonds. The number of double bonds is preferably 1 to 2 and more preferably 1. The number of carbon atoms is preferably 16 to 20, more preferably 16 to 18, and particularly preferably 18. Preferable examples of unsaturated fatty acid include palmitoleic acid having one double bond; $C_1$ oleic acid or vaccenic acid having one double bond (preferably oleic acid); $C_{18}$ linoleic acid having two double bonds; $C_{18}$ linolenic acid (9, 12, 15), linolenic acid (6, 9, 12), and eleostearic acid having three double bonds; and $C_{20}$ linolenic acid (9, 12, 15), linolenic acid (6, 9, 12), and eleostearic acid having two double bonds. More preferably, the unsaturated fatty acid is $C_{16}$ palmitoleic acid having one double bond or $C_{18}$ oleic acid, and particularly preferably oleic acid.

The salts of these fatty acids are not particularly limited as long as they do not impair the effects of the present invention. The salts of these fatty acids are preferably those that do not impair the solubility of free fatty acid in water. Specific examples include salts of alkali metal such as sodium and potassium, and salts of alkaline earth metal, such as calcium and magnesium, and preferably alkali metal salts.

The free fatty acid or its salt in the present invention is not particularly limited in form, and may be in the form of a liquid, an emulsion, or a solid. Examples of the solid form include dry solids, tablets, pills, powders, granules, and capsules. The ratio of component (B) in the UFB generator of the present invention can be suitably selected from the range of 0.0001 to 10 mass % based on the total amount (100 mass %) of components (A), (B), and (C), as long as the effect of the present invention can be achieved.

(C) Gas Generation Component

The gas generation component, which is a target in the present invention, is a component that reacts in the presence of water to generate gas. As long as the gas generation component is a component that reacts in the presence of water to generate gas, it may consist of a single component or a combination of two or more components. The gas generation component may comprise a combination of a gas generation body and its counterpart, as described below.

Target gas (gas) includes, without limitation, carbon dioxide gas, oxygen gas, hydrogen gas, and chlorine gas. Preferable examples include carbon dioxide gas, oxygen gas, and hydrogen gas.

The carbon dioxide gas generation component can be any component that reacts in the presence of water to generate carbon dioxide gas (carbon acid gas). Examples include carbonates or hydrogen carbonates. When a carbonate or hydrogen carbonate is placed in an aqueous solution containing component (A), carbon acid gas is generated. Hydrogen carbonates are known to generate carbon acid gas when heated in water. Preferable examples of carbonates include alkali metal salts such as sodium carbonate and potassium carbonate. Preferable examples of hydrogen carbonates include alkali metal salts such as sodium, hydrogen carbonate and potassium hydrogen carbonate.

The carbonate or hydrogen carbonate can also be used in combination with a component that decomposes the carbonate or hydrogen carbonate in the presence of water to generate carbon acid gas. In the present invention, a component that decomposes a gas generation body such as a carbonate or a component that contributes to gas generation by promoting the decomposition of the gas generation body is referred to as a "counterpart" as a component that is used in combination with the gas generation body. Examples of the counterpart that is used in combination with the carbonate or hydrogen carbonate (gas generation body) include acids and acid salts.

The acid used herein is not particularly limited as long as it reacts with a carbonate or hydrogen carbonate in the presence of water to generate carbon acid gas, and it does not impair the effects of the present invention. Examples include inorganic acids such as hydrochloric acid and sulfuric acid; and organic acids such as succinic acid, fumaric acid, adipic acid, tartaric acid, benzoic acid, citric acid, pyrrolidonic carboxylic acid, salicylic acid, maleic acid, phthalic acid, glutaric acid, and oxalic acid. These can be used alone or in a combination of two or more. Preferable examples of acid salts include salts with alkali metal, such as sodium and potassium.

The oxygen gas generation component can be any component that reacts in the presence of water to generate oxygen gas. Examples include hydrogen peroxide as the oxygen gas generation body. Hydrogen peroxide can also be used in combination with a component (counterpart) that decomposes hydrogen peroxide in the presence of water to generate oxygen gas. Examples of the counterpart used in combination with hydrogen peroxide include hydrogen peroxide degradation enzymes such as catalase, and catalysts such as manganese dioxide.

The hydrogen gas generation component can be any component that reacts in the presence of water to generate hydrogen gas. Examples include hydrogenated salts, boron hydrogenated salts, or hydrochloric acid as the hydrogen gas generation body. The salts of hydrogenated salts or boron hydrogenated salts can be any salts as long as they exert the above effects. Examples include alkali metal salts such as sodium and potassium, and alkaline earth metal salts such as calcium and magnesium. Specifically, examples of hydrogenated salts include sodium hydride, potassium hydride, calcium hydride, and magnesium hydride. Examples of boron hydrogenated salts include sodium borohydride.

Hydrochloric acid can also be used in combination with a component (counterpart) that decomposes hydrochloric acid in the presence of water to generate hydrogen gas. Examples of the counterpart that is used in combination with hydrochloric acid include metal such as iron, zinc, or magnesium.

The chlorine gas generation component can be any component as long as it reacts in the presence of water to generate chlorine gas. Examples include hypochlorites such as sodium hypochlorite as a chlorine gas generation body. The hypochlorite can also be used in combination with a component (counterpart) that decomposes a hypochlorite in the presence of water to produce chlorine gas. Examples of the counterpart used in combination with hypochlorite include acids. Acids are not particularly limited, and examples include inorganic acids, such as hydrochloric acid and sulfuric acid; and organic acids such as succinic acid, fumaric acid, adipic acid, tartaric acid, benzoic acid, citric acid, pyrrolidonic carboxylic acid, salicylic acid, maleic acid, phthalic acid, glutaric acid, and oxalic acid. These acids can be used alone or in a combination of two or more.

In the UFB generator of the present invention, the form of the gas generation component is not particularly limited as long as the gas generation component is configured to generate gas for the first time when it is in contact with water. The gas generation product is preferably in the solid form. Examples of the solid form include dry solids, tablets, pills, powders, granules, and capsules. As mentioned above, the gas generation component may be used in combination with the gas generation body and its counterpart, in which case it is preferable to combine the gas generation body and its counterpart in a separated state so that the reaction occurs only when they come into contact with water. The ratio of component (C) in the UFB generator of the present invention may be suitably selected from a range of 0.1 to 98.9999 mass % per 100 mass % of the total of components (A), (B) and (C) as long as the effects of the present invention can be attained.

(D) Other Components

The UFB generator of the present invention may contain components other than (A), (B), and (C) as long as the effects of the invention are not impaired. Such other components can be suitably selected according to the application and field of application of the UFB generator. The following are merely examples and are not limiting.

Oral Rinses (e.g., Mouthwashes and Gargles)

Examples include wetting agents (e.g., glycerol, propylene glycol, ethanol, and isopropanol), sweeteners (e.g., stevioside, sorbitol, erythritol, and sodium saccharin), disinfectants (e.g., dipotassium glycyrrhizinate, cetylpyridinium chloride, tranexamic acid, isopropyl methylphenol, poppidone-iodine, benzalkonium chloride, and chlorhexidine gluconate ethanol), and sodium fluoride.

Cosmetics

Examples include ethanol, glycerol, butylene glycol, dipropylene glycol, propylene glycol, Vaseline, mineral oil, squalane, higher fatty acids, higher alcohols (e.g., stearyl alcohol, behenyl alcohol, and cetanol), fats (e.g., olive oil, coconut oil, rhea oil, jojoba seed oil, and horse oil), wax (e.g., beeswax and lanolin), plant extracts, cetyl ethylhexanoate, triethyl hexanone, isopropyl myristate, dimethicone, cyclopentasiloxane, etc.

Bath Additives

Examples include inorganic salts (e.g., potassium carbonate, calcium carbonate, sodium sesquicarbonate, sodium chloride, potassium chloride, sodium sulfate, magnesium sulfate, and sodium metasilicate), herbal medicines and plant extracts (e.g., fennel, scutellaria root, phellodendron bark, chamomile, magnolia bark, Houttuynia herb, calmus, cnidium rhizome, citrus unshiu peel, Japanese angelica root, bitter orange peel, capsicum, ginseng, yuzu, wormwood, saposhnikovia root and rhizome, mentha herb, zinger, glycyrrhiza, and cinnamon bark); enzymes (e.g., papain, pancreatin, and proteolytic enzymes), acids (e.g., fumaric acid, succinic acid, malic acid, citric acid, maleic acid, tartaric acid, and lactic acid), moisturizers, vegetable oils (e.g., jojoba oil, olive oil, soya oil, and rice oil), isoflavone, lanolin, glycerol, casein, stearyl alcohol, liquid paraffin, white Vaseline, propylene glycol, skimmed milk powder, squalane, honey, polyethylene glycol, coloring agents (e.g., riboflavin, carotene, chlorophyll, yellow #202, yellow #4, blue #1, green #201, and green #204), anhydrous silica acid, camphor, methyl salutylate, terpin oil, menthol, dextrin, titanium oxide, and flavoring agents.

Food and Drink

Examples include amino acids (e.g., arginine, lysine, and glutamine), minerals (e.g., iron, potassium, and calcium), essential fatty acids (e.g., linolenic acid, DHA, and EPA), vitamins, collagen, peptides, sesamin, chondroitin, and dietary fiber.

Plant Growth Promoter

Examples include nitrates (e.g., ammonium nitrate, magnesium nitrate, and potassium nitrate), sulfates (e.g., ammonium sulfate, magnesium sulfate, and potassium sulfate), phosphates or hydrogen phosphates (e.g., ammonium phosphate, magnesium phosphate, potassium phosphate, and dipotassium hydrogen phosphate), chlorides (e.g., ammonium chloride, magnesium chloride, and potassium chloride), urea, magnesium, calcium, manganese, citric acid, tartaric acid, oxalic acid, acetic acid, and edetic acid.

Seafood Growth Promoter

Examples include proteins and carbohydrates, such as soy powders, fish powders, meat, bone powders, amino acids, corn, and flour; vitamins such as ascorbic acid; and minerals and trace elements.

Detergent and Disinfectant

Examples include anionic surfactants (e.g., alkyl polyoxyethylene sulfate, linear alkylbenzene sulfonate, and alpha olefin sulfonate), cationic surfactants (e.g., dialkyl dimethyl ammonium chloride and alkyl benzalkonium chloride), amphoteric surfactants (e.g., alkyl betaine, alkyl diethylenetriamino acetic acid, and alkyl amine oxide), non-ionic surfactants (e.g., polyoxyethylene alkyl ether, glycerol fatty acid ester, and polyoxyethylene polyoxypropylene glycol), alkaline compounds (e.g., organic alkali compounds such as alkanolamine and alkylamine; and hydroxides of alkali metals, such as sodium hydroxide, potassium hydroxide, sodium carbonate, potassium carbonate, sodium hydrogen carbonate, potassium hydrogen carbonate, sodium silicate, potassium silicate, sodium phosphate, and potassium phosphate), solvents (e.g., ethanol, propylene glycol, and glycerol), hydrotrope agents (e.g., paratoluenesulfonic acid and xylene sulfonic acid or salts thereof), chelating agents (e.g., EDTA, NTA, and MDGA), enzymes (e.g., proteases, amylases, lipases, and cellulases), disinfectants (e.g., polyhexamethylene biguanidine hydrochloride, chlorhexidine, and salts thereof, isopropyl methylphenol, alkyl diaminoethylglycine hydrochloride, benzalkonium chloride, isopropanol, ethanol, povidone-iodine, sodium hypochlorite, phthalal, glutalal, and peracetic acid), dispersing agents (e.g., sodium polyacrylate and polyvinylpyrrolidone), antioxidants (e.g., butyl hydroxytoluene, sodium sulfite, and sodium hydrogen sulfite), pH-adjusting agents (e.g., citric acid, gluconic acid, malic acid, succinic acid, and acetic acid), thickeners, viscosity modifiers, flavoring agents, coloring agents, preservatives, bleaching agents, bleach activators, etc.

(F) Form, Proportion, Dosage, Etc.

The form of the UFB generator of the present invention includes a composition (one agent) containing components (A), (B), and (C), and a product combination (kit or set) in which at least component (C) is packaged separately from components (A) and (B), and these components are combined when used. In addition, a product combination (kit or set) in which a gas generation body is separately packaged from its counterpart as component (C), and combined when used. In the case of a composition (one agent), the form is not particularly limited as long as it is configured to generate gas for the first time when the composition is added to water. The form is preferably a solid form. Examples of such solid forms include dry solids, tablets, pills, powders, granules, capsules.

In the UFB generator of the present invention, the proportion of components (A), (B), and (C) is not particularly limited as long as the effects of the invention are not impaired. Components (A) and (B) are preferably prepared in such a manner that the concentration of component (A) is 0.005 mass % or more, and the concentration of component (B) is 0.0001 mass % or more when added to water for use. The proportion of the UFB generator to water when added to and mixed in water can also be determined taking into account the aforementioned concentration.

The concentration of component (A) in the water is preferably 0.01 mass % or more, more preferably 0.01 to 0.4 mass % or more; and the concentration of component (B) is preferably 0.0005 mass % or more, and more preferably 0.0005 to 0.3 mass %. Water referred to as herein include a wide variety of water, such as aqueous solvents and aqueous solutions.

In component (C), which is added to water for use, the concentration of the gas generation body may be 0.1 mass % or more. In particular, when component (C) is a carbon dioxide gas generation component, it is preferably prepared in such a manner that the concentration of the carbon dioxide gas generation body (carbonate, hydrogen carbonate) in water is 0.1 mass % or more, and used. The concentration of the gas generation body in water is preferably 0.1 mass % or more, more preferably 0.1 to 20 mass %, and particularly preferably 0.5 to 1 mass %.

(II) Method for Generating UFBs

The UFB generation method of the present invention can be performed by adding components (A), (B), and (C) to water with a hardness of 30 to 200 mg/L, and preferably 50 to 200 mg/L, and allowing these three components to coexist in water. The UFB generation method of the present invention is a method capable of generating UFBs in water without particularly introducing gas from outside.

The temperature of water is not particularly limited as long as it is a temperature at which the generation of UFBs is not impaired. The temperature of water is preferably 50° C. or less. Components (A), (B), and (C) can be used in a previously mixed state (in the form of a single composition). It is also possible to mix a product (set or kit) in which at least component (C) is packaged separately from components (A) and (B) before adding to water, or add these three components simultaneously to water when used. Specifically, in a simple manner, desired UFBs can be simply generated by using the UFB generator (combination agent) of the present invention as described above.

Water with a hardness of 30 to 200 mg/L includes tap water as well as aqueous solutions containing various components, depending on the use or application field (such as environmental, industrial, agricultural, fishery, medical and pharmaceutical, cosmetic, and food and beverage fields). Examples of such components include, without limitation, component (D) as mentioned above.

In one example, by mixing components (A), (B), and (C), or the UFB generator of the present invention described above with a lotion with a hardness of 30 to 200 mg/L, the desired UFBs can be generated in the lotion to prepare and obtain a UFB-containing lotion. The UFB-containing lotion may be prepared at the time of each use, or it may be prepared at the time of first use and continued to be used because UFBs are stably retained in water.

In another example, by mixing components (A), (B), and (C), or the UFB generator of the present invention described above with an aqueous solution containing a bactericidal ingredient (e.g., disinfectant and agricultural chemical) with a hardness of 30 to 200 mg/L, the desired UFBs can be generated in the aqueous solution to prepare and obtain a UFB-containing disinfectant or agricultural chemical. By mixing components (A), (B), and (C), or the UFB generator of the present invention with an aqueous solution with a hardness of 30 to 200 mg/L containing a component such as a fertilizer or growth agent, the desired UFBs can be generated in the aqueous solution to prepare and obtain a UFB-containing fertilizer or growth agent. These UFB-containing liquids can also be prepared at the time of each use, or they can be prepared at the time of first use and continued to be used.

Components (A), (B), and (C) used in the UFB generation method of the present invention are as described in section (I). The descriptions in section (I), including the amounts of components (A), (B), and (C) used when mixed with water (concentrations in water), the hardness of the water used, the scattering intensity of UFBs to be generated, and the particle size can be referenced.

(III) UFB-Containing Liquid and Production Method Thereof

The UFB-containing liquid of the present invention comprises the following (A), (B), (c), and (d):
(A) an SL containing acidic SL and lactonic SL in a ratio (mass ratio) of 78:22 to 100:0;
(B) a free fatty acid or salt thereof;
(c) fine bubbles that are formed from at least one gas selected from the group consisting of carbon dioxide gas, oxygen gas, hydrogen gas, and chlorine gas, and that have an average number particle size of less than 1000 nm; and
(d) water.

The types and amounts (concentrations) of components (A), (B), and (c) are as explained in section (I), and the descriptions can be referenced here. Component (d) is water with a hardness of 30 to 200 mg/L, and preferably 50 to 200 mg/L. The water can be used with component (D) dissolved as long as it does not deviate from the range of hardness of 30 to 200 mg/L. Component (D) can be suitably used according to the use or application field (such as environmental, industrial, agricultural, fishery, medical and pharmaceutical, cosmetic, and food and beverage fields). The UFB-containing liquid of the present invention can be used in various fields mentioned above according to component (D).

The particle size of UFBs in the UFB-containing liquid of the present invention may be less than 1000 nm. The UFBs contain fine bubbles having a particle size of 50 to less than 200 nm, fine bubbles having a particle size of 200 to less than 500 nm, and fine bubbles with a particle size of 500 to less than 1000 nm. The UFBs are preferably fine bubbles having a particle size of 500 nm or less. The UFB-containing liquid can be used in various fields (such as environmental, industrial, agricultural, fishery, medical and pharmaceutical, cosmetic, and food and beverage fields) according to the functions based on the particle size of UFB.

In the UFB-containing liquid of the present invention, the scattering intensity, as measured by the method described above, is not limited, and is preferably 5000 cps or more, more preferably 10000 cps or more, and particularly preferably 30000 cps or more.

The UFB-containing liquid of the present invention can be produced by the following method, i.e., the method for producing a UFB-containing liquid, comprising:
(a) the step of adding the following (A), (B), and (C) to water with a hardness of 30 to 200 mg/L, and preferably a hardness of 50 to 200 mg/L to allow these three to coexist in the water; and
(b) the step of generating bubbles in the water,
(A) a SL containing acidic SL and lactonic SL in a ratio (mass ratio) of 78:22 to 100:0,
(B) a free fatty acid or salt thereof, and
(C) a gas generation component.

According to this method, UFBs can be generated in water without particularly introducing gas from outside, and the UFB-containing liquid of the present invention can be prepared and obtained.

The terms "comprising" and "containing" in this specification include the meaning of consisting of and consisting essentially of.

EXAMPLES

In order to aid understanding of the structure and effect of the present invention, the present invention is described below with reference to experimental examples. However, the present invention is not limited to these experimental examples. Unless otherwise specified, the following experiments were conducted at room temperature (25±5° C.) and atmospheric pressure conditions. Unless otherwise specified, "%" described below means "mass %," and "parts" described below means "parts by mass."

Reference Production Example 1: Preparation of SL-Containing Composition 2

(1) A liquid medium containing, per liter, 10 g of aqueous glucose (produced by Nihon Shokuhin Kako Co., Ltd., product name: Nisshoku Gansui Kessho Budoto), 10 g of peptone (produced by Oriental Yeast Co., Ltd., product name: Peptone CB90M), and 5 g of yeast extract (produced by Asahi Food & Healthcare Co., Ltd., product name: Meast Powder N) was used as a culture medium. *Candida bombicola* ATCC22214 was cultured in the medium while being shaken at 30° C. for 2 days. This was used as a liquid pre-culture.

(2) The liquid pre-culture was inoculated in a proportion of 4% into a main culture medium (3 L) placed in a 5-liter fermenter; and then cultured at 30° C. at an aeration rate of 0.6 vvm for 6 days for fermentation. The main culture medium contained, per liter, 100 g of aqueous glucose, 50 g of palm olein (produced by NOF Corporation, product name: Palmary 2000), 50 g of oleic acid (produced by Acid Chem, product name: Palmac 760), 1 g of sodium chloride, 10 g of monopotassium phosphate, 10 g of magnesium sulfate heptahydrate, 2.5 g of yeast extract (produced by Asahi Food & Healthcare Co., Ltd., product name: Meast Powder N), and 1 g of urea (pH of 4.5 to 4.8 before sterilization).

On the sixth day from the start of culturing, the fermentation was stopped. The liquid culture removed from the fermenter was heated and then returned to room temperature and allowed to stand for 2 to 3 days. As a result, the liquid culture was separated into the following three layers in this order from the bottom: a liquid brown precipitate layer, a milky-white solid layer presumably mainly containing fungal cells, and a supernatant. After the supernatant was removed, industrial water or groundwater was added in an amount equal to the amount of the supernatant removed. While the resulting mixture was stirred, a 48 massy aqueous sodium hydroxide solution was gradually added to adjust the pH to 6.5 to 6.9, thus solubilizing SLs contained in the liquid culture. The resulting product was centrifuged with a table-top centrifuge (Westfalia, produced by Westfalia Separator AG) to precipitate milky-white solids, and a supernatant was collected. While the collected supernatant was stirred, 62.5 mass % of sulfuric acid was gradually added to adjust the pH to 2.5 to 3.0, thus insolubilizing SLs again. After the resulting mixture was allowed to stand for 2 days, the supernatant was removed as much as possible by decantation. The residue was obtained as SL-containing composition 2 (having a water content of about 50%).

Reference Production Example 2: Preparation of SL-Containing Composition 1

An aqueous sodium hydroxide solution was added to SL-containing composition 2 obtained above in Reference Production Example 1 to adjust the pH to 14, and treatment was performed at 80° C. for 2 hours for hydrolysis (alkali hydrolysis). Then, the resultant was returned to room temperature, and the pH was adjusted to 10 using sulfuric acid (9.8 M aqueous solution). The insoluble matter produced was removed by filtration, and the filtrate was obtained as SL-containing composition 1 (having a water content of about 30%).

Reference Production Example 3: Preparation of SL-Containing Composition 3

SL-containing composition 1 prepared above in Reference Production Example 2 was purified based on Example 1 of WO2015/034007, and the resulting powder was obtained as SL-containing composition 3.

Experimental Example 1: Generation of Fine Bubbles Consisting of Carbon Dioxide Gas ($CO_2$ Gas) (1)

The starting materials used in Experimental Example 1 are as follows.
SL-containing composition 1: an SL-containing composition containing 34% of SL (acidic SL:lactonic SL=100:0 (mass ratio)) and 2.5% of oleic acid (see Reference Production Example 2) SL-containing composition 2: an SL-containing composition containing 58% of SL (acidic SL:lactonic SL=78:22 (mass ratio)) and 4.3% of oleic acid (see Reference Production Example 1) Sodium alkyl polyoxyethylene sulfate: Taycapol NE1230 (containing of sodium alkyl polyoxyethylene sulfate) (produced by Tayca Corporation)
Alkyl polyglycoside: TRITON® CG-50 (containing 50% of alkyl polyglycoside) (produced by Dow Chemical)
Lauryl dimethylaminoacetic acid betaine: Rikabion A-100 (containing 30% of lauryl dimethylaminoacetic acid betaine) (produced by New Japan Chemical Co., Ltd.)

After the components were mixed so that the final concentration in water satisfied the ratio (final concentration: mass %) shown in Tables 1 to 3, the resulting mixture was added to 1 L of tap water (hardness: 100 mg/L) (room temperature) placed in a glass beaker, and dissolved by stirring with a stir bar and a stirrer (pH: 8.3), and the components were allowed to react (generation of carbon dioxide gas).

The resultant was allowed to stand at room temperature, and after 12 hours, the scattering intensity and average number particle size (hereinafter, also simply abbreviated as "particle size") were measured. For the measurements of the scattering intensity and particle size, a dynamic light scattering spectrophotometer (DLS 6500-HL: produced by Otsuka Electronics Co., Ltd.) was used. Specifically, the aqueous solution prepared above was filtered through a 0.45-μm pore size filter using a 10-mL syringe to remove solid impurities, the filtrate was collected in a cylindrical measurement cell with a diameter of 21 mm, and this was subjected as a measurement sample to the dynamic light scattering spectrophotometer under the following conditions.

Measurement conditions of dynamic light scattering spectrophotometer
Measurement temperature: 25° C.,
Number of integration: 400 times,
Sampling time: 10 μsec,
Measurement channel: 1024 ch,
Measurement angle: 30°,
Pinhole 1: 0.5,
Pinhole 2: 0.2.
Tables 1 to 3 show the results.

The scattering intensity was calculated by subtracting the scattering intensity of an aqueous solution in which components A and B (SL-containing composition 1 or 2) or a surfactant was dissolved (control sample 1) and the scattering intensity of an aqueous solution in which component C (C1: gas generation body, C2: counterpart) was dissolved (control sample 2) from the scattering intensity of an aqueous solution in which all of the components were dissolved (test sample), as shown in the following formula 2. For dissolution of each component, tap water (hardness: 100 mg/L) with a scattering intensity of 585 cps was used.

Scattering intensity=[scattering intensity of test sample]−[scattering intensity of control sample 1]−[scattering intensity of control sample 2]   Formula 2:

The evaluations shown in Tables 1 to 3 are based on the following criteria.
Scattering Intensity
AA: 30000 cps or more
A: 10000 cps or more and less than 30000 cps
B: 5000 cps or more and less than 10000 cps
C: less than 5000 cps
Average Number Particle Size
AA: 50 nm or more and less than 200 nm
A: 200 nm or more and less than 500 nm
B: 500 nm or more and less than 1000 nm
C: 1000 nm or more
Since the particle size cannot be measured when the scattering intensity is 8000 cps or less, "−" is described in the evaluation columns.

TABLE 1

Final concentration in water: mass %

| | | Test sample | | | | | | | |
|---|---|---|---|---|---|---|---|---|---|
| | | 1-1 | 1-2 | 1-3 | 1-4 | 1-5 | 1-6 | 1-7 | 1-8 |
| A&B | SL-containing composition 1 | 0.015 | 0.03 | 0.15 | 1.18 | 0.03 | 0 | 0.03 | 0.03 |
| | (A: acidic SL) | (0.005) | (0.01) | (0.05) | (0.4) | (0.01) | | (0.01) | (0.01) |
| | (B: free fatty acid) | (0.0004) | (0.0008) | (0.004) | (0.032) | (0.0008) | | (0.0008) | (0.0008) |
| | SL-containing composition 2 | 0 | 0 | 0 | 0 | 0 | 0.02 | 0 | 0 |
| | (A: acidic + lactonic SL) | | | | | | (0.01) | | |
| | (B: free fatty acid) | | | | | | (0.0006) | | |
| C   C1 | Sodium hydrogen carbonate | 0.5 | 0.49 | 0.45 | 0.5 | 0.1 | 0.49 | 0 | 0 |
| | Sodium carbonate | 0 | 0 | 0 | 0 | 0 | 0 | 0 | 0 |
| | Potassium hydrogen carbonate | 0 | 0 | 0 | 0 | 0 | 0 | 0 | 0.49 |
| C2 | Sodium sulfate | 0 | 0 | 0 | 0 | 0.4 | 0 | 0.49 | 0 |
| Generated gas | | $CO_2$ | $CO_2$ | $CO_2$ | $CO_2$ | $CO_2$ | $CO_2$ | $CO_2$ | $CO_2$ |
| Evaluation | Scattering intensity: cps | 11848 | 52923 | 164465 | 1893900 | 54879 | 10205 | 12136 | 61815 |
| | (evaluation) | (A) | (AA) | (AA) | (AA) | (AA) | (A) | (A) | (AA) |
| | Average number particle size: nm | 104.5 | 135.2 | 110.2 | 201.0 | 151.5 | 141.7 | 162.3 | 177.0 |
| | (evaluation) | (AA) | (AA) | (AA) | (A) | (AA) | (AA) | (AA) | (AA) |

TABLE 2

Final concentration in water: mass %

| | | Test sample | | | | | | |
|---|---|---|---|---|---|---|---|---|
| | | 1-9 | 1-10 | 1-11 | 1-12 | 1-13 | 1-14 | 1-15 |
| A&B | SL-containing composition 1 | 0 | 0.003 | 0.03 | 1.18 | 0 | 0 | 0 |
| | (A: acidic SL) | | (0.001) | (0.01) | (0.4) | | | |
| | (B: free fatty acid) | | (0.00008) | (0.0008) | (0.032) | | | |
| Surfactant* | Sodium alkyl polyoxyethylene sulfate | 0 | 0 | 0 | 0 | 0.01 | 0 | 0 |
| | Alkyl polyglycoside | 0 | 0 | 0 | 0 | 0 | 0.01 | 0 |
| | Alkylbetaine | 0 | 0 | 0 | 0 | 0 | 0 | 0.01 |
| C   C1 | Sodium hydrogen carbonate | 0.5 | 0.5 | 0.05 | 0 | 0.49 | 0.49 | 0.49 |
| C2 | Sodium sulfate | 0 | 0 | 0.44 | 0 | 0 | 0 | 0 |
| Generated gas | | $CO_2$ | $CO_2$ | $CO_2$ | None | $CO_2$ | $CO_2$ | $CO_2$ |
| Evaluation | Scattering intensity: cps | 0 | 0 | 6254 | 0 | 2021 | 246 | 0 |
| | (evaluation) | (C) | (C) | (B) | (C) | (C) | (C) | (C) |
| | Average number particle size: nm | (—) | (—) | (—) | (—) | (—) | (—) | (—) |
| | (evaluation) | | | | | | | |

*Converted to the amount of active ingredient (surfactant) contained in commercial product

TABLE 3

Final concentration in water: mass %

| | | Test sample | | | | |
|---|---|---|---|---|---|---|
| | | 1-16 | 1-17 | 1-18 | 1-19 | 1-20 |
| A&B | SL-containing composition 1 | 0.03 | 0.03 | 0.3 | 0.06 | 0.18 |
| | (A: acidic SL) | (0.01) | (0.01) | (0.1) | (0.02) | (0.06) |
| | (B: free fatty acid) | (0.0008) | (0.0008) | (0.008) | (0.0016) | (0.0048) |
| | Sodium hydrogen carbonate | 0 | 5 | 4.9 | 0 | 0 |
| C | Potassium hydrogen carbonate | 0 | 0 | 0 | 10 | 20 |
| | Potassium carbonate | 4.7 | 0 | 0 | 0 | 0 |
| Generated gas | | $CO_2$ | $CO_2$ | $CO_2$ | $CO_2$ | $CO_2$ |
| Evaluation | Scattering intensity: cps | 32669 | 13800 | 69000 | 122670 | 23148 |
| | (evaluation) | (AA) | (A) | (AA) | (AA) | (A) |
| | Average number particle size: nm | 191.1 | 170.3 | 115.1 | 291.2 | 393.8 |
| | (evaluation) | (AA) | (AA) | (AA) | (AA) | (AA) |

The results of Tables 1 and 3 confirmed that an SL-containing composition comprising a free fatty acid (SL-containing composition 1 or 2) and a gas generation component (carbonate or hydrogen carbonate) were combined and added to water to thereby generate bubbles $CO_2$, and that they were stably retained in water even after being left for at least 12 hours. Further, from their particle size and scattering intensity, it was confirmed that the bubbles were fine bubbles corresponding to ultrafine bubbles. In the aqueous solution generating the fine bubbles (UFB), the SL concentration was 0.005% or more, and preferably 0.01% or more, the free fatty acid concentration was 0.0004% or more, and the concentration of the gas generation body was 0.1% or more. From the results shown in Table 3, stable fine bubbles (UFB) were obtained even when the concentration of the gas generation body was as high as 20 mass %. It is thus considered that the upper limit of the concentration of the gas generation body is not particularly limited as long as it is soluble in water.

This confirmed that SL at a concentration of 0.005% or more, a free fatty acid at a concentration of 0.0004% or more, and a gas generating body at a concentration of 0.1% or more were allowed to coexist at least in water, thereby generating fine bubbles (UFB).

On the other hand, it was confirmed that when only the gas generation body was contained and no SL or free fatty acid was contained, or when the gas generation body was combined with a surfactant in place of the SL-containing composition, bubbles $CO_2$ were generated, while UFB was not generated (Table 2).

Experimental Example 2: Generation of Fine Bubbles Consisting of $CO_2$ Gas (2)

The influence of free fatty acids in the reaction system was evaluated.

The starting materials used in Experimental Example 2 are as follows.

SL-containing composition 1: an SL-containing composition containing 34% of SL (acidic SL:lactonic SL=100:0 (mass ratio)) and 2.5% of oleic acid (see Reference Production Example 2) SL-containing composition 3: an SL-containing composition containing 99.8% of SL (acidic SL:lactonic SL=100:0 (mass ratio)) and 0.2% of oleic acid (see Reference Production Example 3)

After the components were mixed so that the final concentration in water satisfied the ratio (mass %) shown in Table 4, the resulting mixture was added to 1 L of tap water (hardness: 100 mg/L) (room temperature) placed in a glass beaker, and dissolved by stirring with a stir bar and a stirrer (pH: 8.3), and the components were allowed to react (generation of $CO_2$ gas).

The resultant was allowed to stand at room temperature, and after 12 hours, the scattering intensity and particle size were measured in the same manner as in Experimental Example 1. The scattering intensity was calculated by subtracting the scattering intensity of an aqueous solution in which SL-containing composition 1 or 3 was dissolved (control sample 1) and the scattering intensity of an aqueous solution in which components B and C were dissolved (control sample 2) from the scattering intensity of an aqueous solution in which all of the components were dissolved (test sample), as shown in formula 2 above.

Table 4 shows the results.

TABLE 4

| | | Final concentration in water: mass % | | | | | |
|---|---|---|---|---|---|---|---|
| | | Test sample | | | | | |
| | | 2-1 | 2-2 | 2-3 | 2-4 | 2-5 | 2-6 |
| A&B | SL-containing compositions (A: acidic SL) (B: free fatty acid) | 0.01000 (0.00998) (0.00002) | 0.01000 (0.00998) (0.00002) | 0.01000 (0.00998) (0.00002) | 0.01000 (0.00998) (0.00002) | 0.0500 (0.0499) (0.0001) | 0 |
| | SL-containing composition 1 (A: acidic SL) (B: free fatty acid) | 0 | 0 | 0 | 0 | 0 | 0.03 (0.0092) (0.0008) |
| B | Potassium oleate | 0 | 0.00001 | 0.0001 | 0.001 | 0 | 0 |
| C | Sodium hydrogen carbonate | 0.49 | 0.49 | 0.49 | 0.49 | 0.49 | 0.49 |
| | SL concentration in water (%) | 0.00998 | 0.00998 | 0.00998 | 0.00998 | 0.0499 | 0.0092 |
| | Total free fatty add concentration in water (%) | 0.00002 | 0.00003 | 0.00012 | 0.00102 | 0.0001 | 0.0008 |
| | Generated gas | $CO_2$ | $CO_2$ | $CO_2$ | $CO_2$ | $CO_2$ | $CO_2$ |
| Evaluation | Scattering intensity: cps (evaluation) | 2124 (C) | 5026 (B) | 10957 (A) | 336760 (AA) | 552108 (AA) | 52923 (AA) |
| | Average number particle size: nm (evaluation) | (—) | (—) | 116.8 (AA) | 119.1 (AA) | 165.7 (AA) | 135.2 (AA) |

| | | Test sample | | | | | |
|---|---|---|---|---|---|---|---|
| | | 2-7 | 2-9 | 2-10 | 2-11 | 2-12 | 2-13 |
| A&B | SL-containing compositions (A: acidic SL) (B: free fatty acid) | 0 | 0.01000 (0.00998) (0.00002) | 0.01000 (0.00998) (0.00002) | 0.01000 (0.00998) (0.00002) | 0.01000 (0.00998) (0.00002) | 0 |
| | SL-containing composition 1 (A: acidic SL) (B: free fatty acid) | 0.15 (0.046) (0.004) | 0 | 0 | 0 | 0 | 0 |
| B | Potassium oleate | 0 | 0 | 0.00001 | 0.0001 | 0001 | 0.01 |
| C | Sodium hydrogen carbonate | 0.49 | 0 | 0 | 0 | 0 | 0.49 |
| | SL concentration in water (%) | 0.046 | 0.00998 | 0.00998 | 0.00998 | 0.00998 | 0 |
| | Total free fatty add concentration in water (%) | 0.004 | 0.00002 | 0.00003 | 0.00012 | 0.00102 | 0.01 |

TABLE 4-continued

| | Final concentration in water: mass % | | | | | |
|---|---|---|---|---|---|---|
| Generated gas | $CO_2$ | None | None | None | None | None |
| Evaluation Scattering intensity: cps (evaluation) | 164465 (AA) | 0 (C) | 0 (C) | 0 (C) | 0 (C) | 595 (C) |
| Average number particle size: nm (evaluation) | 110.2 (AA) | (—) | (—) | (—) | (—) | (—) |

The results of Table 4 confirmed that the generation of fine bubbles corresponding to ultrafine bubbles and their stable retention in water after being left for at least 12 hours required the presence of a predetermined amount of free fatty acid in addition to SL and the gas generation body. The concentration of free fatty acid required to generate and maintain fine bubbles (UFB) in the aqueous solution is considered to be at least 0.0001%.

Experimental Example 3: Generation of Fine Bubbles Consisting of $CO_2$ Gas (3)

SL or the nonionic surfactant with an HLB of 6 to 12 disclosed in PTL 4 (JP2013-207122A) was used as a surfactant, $CO_2$ gas was generated in water in the same manner as in Experimental Example 1, and the generated bubbles were evaluated.

The starting materials used in Experimental Example 3 are as follows.

SL-containing composition 1: same as Experimental Example 1
Tetraoleic acid POE sorbit (40EO): Rheodol 440V (produced by Kao Corporation)
Polyoxyethylene hardened castor oil (25EO): Emanon CH-25 (produced by Kao Corporation)
POE lauryl ether: Emulgen 103 (produced by Kao Corporation)
Sorbitan monooleate (6EO): Rheodol TW-0106V (produced by Kao Corporation)
POE stearyl ether (6EO): Emulgen 306P (produced by Kao Corporation)

After the components were mixed so that the final concentration in water satisfied the ratio (mass %) shown in Table 5, the resulting mixture was added to 1 L of tap water (hardness: 100 mg/L) (room temperature) placed in a glass beaker, and dissolved by stirring with a stir bar and a stirrer (pH: 8.3), and the components were allowed to react (generation of carbon dioxide gas).

The resultant was allowed to stand at room temperature, and after 12 hours, the scattering intensity and particle size were measured in the same manner as in Experimental Example 1.

The scattering intensity was calculated by subtracting the scattering intensity of an aqueous solution in which SL-containing composition 1 or a surfactant was dissolved (control sample 1) and the scattering intensity of an aqueous solution in which component C was dissolved (control sample 2) from the scattering intensity of an aqueous solution in which all of the components were dissolved (test sample), as shown in formula 2 above.

Table 5 shows the results.

TABLE 5

| | | Final concentration in water: mass % | | | | | | |
|---|---|---|---|---|---|---|---|---|
| | | Test sample | | | | | | |
| | | 3-1 | 3-2 | 3-3 | 3-4 | 3-5 | 3-6 | 3-7 |
| A&B | SL-containing composition 1 (A: acidic SL) (B: free fatty acid) | 0.03 (0.01) (0.0008) | 0 | 0 | 0 | 0 | 0 | 0 |
| | Tetraoleic acid POE sorbit (40EO) | 0 | 0.01 | 0 | 0 | 0 | 0 | 0 |
| | Polyoxyethylene hardened castor oil (25EO) | 0 | 0 | 0.01 | 0 | 0 | 0 | 0 |
| Surfactant* | POE lauryl ether | 0 | 0 | 0 | 0.01 | 0 | 0 | 0 |
| | Sorbitan monooleate (6EO) | 0 | 0 | 0 | 0 | 0.01 | 0 | 0 |
| | POE stearyl ether (6EO) | 0 | 0 | 0 | 0 | 0 | 0.01 | 0 |
| C | Sodium hydrogen carbonate | 0.49 | 0.49 | 0.49 | 0.49 | 0.49 | 0.49 | 0.49 |
| Generated gas | | $CO_2$ | $CO_2$ | $CO_2$ | $CO_2$ | $CO_2$ | $CO_2$ | $CO_2$ |
| Evaluation | Scattering intensity: cps (evaluation) | 52923 (AA) | 0 (C) | 0 (C) | 0 (C) | 0 (C) | 1860 (C) | 0 (C) |
| | Average number particle size: nm (evaluation) | 135.2 (AA) | (—) | (—) | (—) | (—) | (—) | (—) |

*Converted to the amount of active ingredient (surfactant) contained in commercial product.

As shown in Table 5, when a surfactant (nonionic surfactant) was used in place of SL-containing composition 1 (SL and a free fatty acid), the generation of fine bubbles corresponding to ultrafine bubbles was not recognized. This confirmed that the generation of fine bubbles (UFB) requires the presence of SL and a free fatty acid, in addition to the gas generation body.

Experimental Example 4: Generation of Fine Bubbles Consisting of Oxygen Gas, Hydrogen Gas, or Chlorine Gas In place of $CO_2$ gas, $O_2$ gas, $H_2$ gas, or $Cl_2$ gas was generated in water, and the generated bubbles were evaluated.

The starting materials used in Experimental Example 4 are as follows.
- SL-containing composition 1: same as Experimental Example 1 Catalase: Asc Super 25 (produced by MGC Advance Co., Ltd.)

After the components were mixed so that the final concentration in water satisfied the ratio (mass %) shown in Table 6, the resulting mixture was added to 1 L of tap water (hardness: 100 mg/L) (room temperature) placed in a glass beaker, and dissolved by stirring with a stir bar and a stirrer (pH: 8.0), and the components were allowed to react (generation of gas).

The resultant was allowed to stand at room temperature, and after 12 hours, the scattering intensity and particle size were measured in the same manner as in Experimental Example 1. The scattering intensity was calculated by subtracting the scattering intensity of an aqueous solution in which SL-containing composition 1 was dissolved (control sample 1) and the scattering intensity of an aqueous solution in which component C (C1: gas generation body, C2: counterpart) was dissolved (control sample 2) from the scattering intensity of an aqueous solution in which all of the components were dissolved (test sample), as shown in formula 2 above.

Table 6 shows the results.

Experimental Example 5: Preparation and Evaluation of Mouthwashes

According to the formulation shown in Table 7, the components were mixed and dissolved in purified water (hardness: 80 mg/L) to prepare mouthwashes (mouthwashes 1 and 2 of the present invention and comparative mouthwashes 1 to 3) (pH: 6.5). Specifically, after components 1 to 3 shown in Table 7 were mixed as needed, the resulting mixture was added and dissolved in a solution prepared by mixing beforehand (components 4 to 6 and 8), and the pH was adjusted to 6.5 with a pH adjuster (component 7), thereby preparing a mouthwash.

For the prepared mouthwashes, the generation of ultrafine bubbles and detergency were evaluated in the following manner.

(1) Evaluation of Generation of Ultrafine Bubbles

The mouthwashes were allowed to stand at room temperature, and after 12 hours, the scattering intensity and particle size were measured in the same manner as in Experimental Example 1, and evaluated according to the same criteria as in Experimental Example 1.

(2) Evaluation of Detergency

A mucin aqueous solution was added dropwise to a HAP disk (Apatite Pellet APP-100, 10 mm×10 mm×2 mm) and dried to produce a pseudo-oral stain test piece. The test piece was immersed in each mouthwash (mouthwashes 1 and 2 of the present invention and comparative mouthwashes 1 to 3) (37° C.) for 3 minutes. After immersion, the test pieces were rinsed with running water for 30 seconds, dried, and visually observed. Pieces for which no stain could be visually confirmed were stained using Power Quick Residual Protein Detector (produced by Saraya Co., Ltd.). The degree of staining was visually observed again, and the detergency was evaluated according to the following criteria.

Detergency Evaluation

TABLE 6

Final concentration in water: mass %

| | | Test sample | | | | | | | | |
|---|---|---|---|---|---|---|---|---|---|---|
| | | 4-1 | 4-2 | 4-3 | 4-4 | 4-5 | 4-6 | 4-7 | 4-8 | 4-9 |
| A&B | SL-containing composition 1 | 0.03 | 0.15 | 0.03 | 0.15 | 0.03 | 0.15 | 0 | 0 | 0 |
| | (A: acidic SL) | (0.01) | (0.05) | (0.01) | (0.05) | (0.01) | (0.05) | | | |
| | (B: free fatty acid) | (0.0008) | (0.004) | (0.0008) | (0.004) | (0.0008) | (0.004) | | | |
| C | C1 Hydrogen peroxide | 0.17 | 0.16 | 0 | 0 | 0 | 0 | 0.18 | 0 | 0 |
| | Sodium borohydride | 0 | 0 | 0.1 | 0.1 | 0 | 0 | 0 | 0.5 | 0 |
| | Sodium hypochlorite | 0 | 0 | 0 | 0 | 0.47 | 0.47 | 0 | 0 | 0.47 |
| | C2 Catalase | 0.1 | 0.1 | 0 | 0 | 0 | 0 | 0.1 | 0 | 0 |
| | Hydrochloric acid | 0 | 0 | 0 | 0 | 0.11 | 0.11 | 0 | 0 | 0.11 |
| Generated gas | | $O_2$ | $O_2$ | $H_2$ | $H_2$ | $Cl_2$ | $Cl_2$ | $O_2$ | $H_2$ | $Cl_2$ |
| Evaluation | Scattering intensity: cps | 237347 | 72543 | 14879 | 423315 | 12840 | 88647 | 0 | 0 | 0 |
| | (evaluation) | (AA) | (AA) | (A) | (AA) | (A) | (AA) | (C) | (C) | (C) |
| | Average number particle size: nm | 230.8 | 184.0 | 120.4 | 184.0 | 176.8 | 164.4 | (—) | (—) | (—) |
| | (evaluation) | (A) | (AA) | (AA) | (AA) | (AA) | (AA) | | | |

As shown in Table 6, it was confirmed that when SL, a free fatty acid, and various gas generation components (C1: gas generation body, C2: counterpart) were allowed to coexist in water, bubbles of various gases (oxygen gas, hydrogen gas, and chlorine gas) were generated and stably retained in water. Further, from their particle size and scattering intensity, it was confirmed that the bubbles were fine bubbles corresponding to ultrafine bubbles.

AA: No stain (without visualizing treatment) remained, and almost no stain was observed even after visualizing treatment.

A: Almost no stain (without visualizing treatment) remained, but some stains remained after visualizing treatment.

B: A few stains (without visualizing treatment) remained.

C: Many stains (without visualizing treatment) remained.

Table 7 also shows the results.

TABLE 7 mass %

Mouthwash

|  |  | Mouthwash of the present invention | | Comparative mouthwash | | |
|---|---|---|---|---|---|---|
|  |  | 1 | 2 | 1 | 2 | 3 |
| Formulation | 1. SL-containing composition 1 | 0.03 | 0.3 | 0.03 | 0 | 0 |
|  | (A: acidic SL) | (0.01) | (0.1) | (0.01) |  |  |
|  | (B: free fatty acid) | (0.0008) | (0.008) | (0.0008) |  |  |
|  | 2. Sodium hydrogen carbonate | 0.49 | 4.9 | 0 | 0.49 | 0.49 |
|  | 3. Sodium alkyl polyoxyethylene sulfate | 0 | 0 | 0 | 0 | 0.01 |
|  | 4. Cetylpyridinium chloride | 0.05 | 0.05 | 0.05 | 0.05 | 0.05 |
|  | 5. Glycerol | 5 | 5 | 5 | 5 | 5 |
|  | 6. Xylitol | 2 | 2 | 2 | 2 | 2 |
|  | 7. pH adjuster *1 | Appropriate amount | Appropriate amount | Appropriate amount | Appropriate amount | Appropriate amount |
|  | 8. Purified water | Remnant | Remnant | Remnant | Remnant | Remnant |
|  | Total | 100 | 100 | 100 | 100 | 100 |
| Evaluation | Evaluation of scattering intensity | AA | AA | C | C | C |
|  | Evaluation of average number particle size | AA | AA | C | C | C |
|  | Detergency | AA | AA | B | B | A |

*1 pH adjuster: citric acid and sodium citrate

As shown in Table 7, it was confirmed for the mouthwashes of the present invention that components 1 and 2 were added and dissolved in an aqueous solution to thereby generate fine bubbles (UFB), and that their bubbles were stably retained in water. It was also confirmed that the mouthwashes of the present invention had superior detergency compared with the comparative mouthwashes, for which the generation of fine bubbles (UFB) was not confirmed.

Experimental Example 6: Preparation and Evaluation of Gargles

According to the formulation shown in Table 8, the components were mixed and dissolved in purified water (hardness: 80 mg/L) to prepare gargles (gargles 1 and 2 of the present invention and comparative gargles 1 to 3) (pH: 6.5). Specifically, after components 1 to 3 shown in Table 8 were mixed as needed, the resulting mixture was added and dissolved in an aqueous solution prepared by mixing beforehand (components 4, 5, and 7), and the pH was adjusted to 6.5 with a pH adjuster (component 6), thereby obtaining a gargle.

For the prepared gargles, the generation of ultrafine bubbles and antiseptic properties were evaluated in the following manner.

(1) Evaluation of Generation of Ultrafine Bubbles

The gargles were allowed to stand at room temperature, and after 12 hours, the scattering intensity and particle size were measured in the same manner as in Experimental Example 1, and evaluated according to the same criteria as in Experimental Example 1.

(2) Evaluation of Antiseptic Properties

Each of the gargles (gargles 1 and 2 of the present invention and comparative gargles 1 to 3) adjusted to 30° C. and a bacterial liquid (*Streptococcus mutans*: ATCC25175) ($10^7$ CFU/mL) were mixed at a mass ratio of 9:1. After 1 minute, the reaction was stopped with an inactivating agent (containing 4% polysorbate 80, 0.3% lecithin Tween 80 (NOF Corporation), and soybean-derived lecithin (FUJIFILM Wako Pure Chemical Corporation)). The obtained reaction liquid was serially diluted, and mixed with a medium (tryptone soy agar medium), followed by culture at 37° C. for 24 hours. Then, the number of colonies was counted. The number of colonies counted was compared with the initial bacterial count ($10^7$ CFU/mL) to calculate the logarithmic reduction value. From the calculated logarithmic reduction value, the antiseptic properties of each gargle were evaluated according to the following criteria.

Evaluation of Antiseptic Properties
AA: a logarithmic reduction value of 2.0 or more
A: a logarithmic reduction value of less than 1.5
B: a logarithmic reduction value of less than 1.0
C: a logarithmic reduction value of less than 0.5
Table 8 also shows the results.

TABLE 8 mass %

Gargle

|  |  | Gargle of the present invention | | Comparative gargle | | |
|---|---|---|---|---|---|---|
|  |  | 1 | 2 | 1 | 2 | 3 |
| Formulation | 1. SL-containing composition 1 | 0.03 | 0.3 | 0.03 | 0 | 0 |
|  | (A: acidic SL) | (0.01) | (0.1) | (0.01) |  |  |
|  | (B: free fatty acid) | (0.0008) | (0.008) | (0.0008) |  |  |
|  | 2. Sodium hydrogen carbonate | 0.49 | 4.9 | 0 | 0.49 | 0.49 |

TABLE 8-continued

| | | Gargle | | | | | mass % |
|---|---|---|---|---|---|---|---|
| | | | Gargle of the present invention | | Comparative gargle | | |
| | | | 1 | 2 | 1 | 2 | 3 |
| | 3. Sodium alkyl ether sufate | | 0 | 0 | 0 | 0 | 0.01 |
| | 4. Sodium lauryldiaminoethylglycine | | 0.33 | 0.33 | 0.33 | 0.33 | 0.33 |
| | 5. Glycerol | | 5 | 5 | 5 | 5 | 5 |
| | 6. pH adjuster *[1] | | Appropriate amount | Appropriate amount | Appropriate amount | Appropriate amount | Appropriate amount |
| | 7. Purified water | | Remnant | Remnant | Remnant | Remnant | Remnant |
| | Total | | 100 | 100 | 100 | 100 | 100 |
| Evaluation | Evaluation of scattering intensity | | AA | AA | C | C | C |
| | Evaluation of average number particle size | | AA | AA | C | C | C |
| | Antiseptic power | | A | AA | B | B | B |

*[1] pH adjuster: citric acid and sodium citrate

As shown in Table 8, it was confirmed for the gargles of the present invention that components 1 and 2 were added and dissolved in an aqueous solution to thereby generate fine bubbles (UFB), and that their bubbles were stably retained in water. It was also confirmed that the gargles of the present invention had superior antiseptic power compared with the comparative gargles, for which the generation of fine bubbles (UFB) was not confirmed.

Experimental Example 7: Preparation and Evaluation of Lotions

According to the formulation shown in Table 9, the components were mixed and dissolved in purified water (hardness: 80 mg/L) to prepare lotions (lotions 1 and 2 of the present invention and comparative lotions 1 to 3) (pH: 5.0). Specifically, after components 1 to 3 shown in Table 9 were mixed as needed, the resulting mixture was added and dissolved in a solution prepared by mixing beforehand (components 4, 5, and 7), and the pH was adjusted to 5.0 with a pH adjuster (component 6), thereby obtaining a lotion.

For the prepared lotions, the generation of ultrafine bubbles and feel in use (moisture and irritating sensation) during application to the skin were measured, and moisture retention and irritation were evaluated in the following manner.

(1) Evaluation of Generation of Ultrafine Bubbles

The lotions were allowed to stand at room temperature, and after 12 hours, the scattering intensity and particle size were measured in the same manner as in Experimental Example 1, and evaluated according to the same criteria as in Experimental Example 1.

(2) Measurement of Feel in Use for Skin

Five expert panelists were asked to apply each lotion (lotions 1 and 2 of the present invention and comparative lotions 1 to 3) to their faces (amount of lotion applied to face: 5 mL) after face washing, and to evaluate the moisture and irritating sensation according to the following criteria.

Moisture (Moisture Retention)

1 hour after application, moisture when touching the skin was evaluated by comparing skin (on the face) to which the lotion was applied with skin to which none was applied (control skin).

AA: moister than control skin
A: slightly moister than control skin
B: less moist than control skin
C: not moister than control skin Irritating Sensation (Irritation)

Skin irritation during application was evaluated.
A: no irritation
B: slight irritation
C: considerable irritation Table 9 also shows the results.

TABLE 9

| | | Lotion | | | | | mass % |
|---|---|---|---|---|---|---|---|
| | | | Lotion of the present invention | | Comparative lotion | | |
| | | | 1 | 2 | 1 | 2 | 3 |
| Formulation | 1. SL-containing composition 1 | | 0.03 | 0.3 | 0.03 | 0 | 0 |
| | (A: acidic SL) | | (0.01) | (0.1) | (0.01) | | |
| | (B: free fatty acid) | | (0.0008) | (0.008) | (0.0008) | | |
| | 2. Sodium hydrogen carbonate | | 0.49 | 4.9 | 0 | 0.49 | 0.49 |
| | 3. Polyoxyethylene hardened castor oil | | 0 | 0 | 0 | 0 | 0.01 |
| | 4. Glycerol | | 5 | 5 | 5 | 5 | 5 |
| | 5. Sodium hyaluronate | | 0.1 | 0.1 | 0.1 | 0.1 | 0.1 |

TABLE 9-continued

| | | Lotion | | | | mass % |
|---|---|---|---|---|---|---|
| | | Lotion of the present invention | | Comparative lotion | | |
| | | 1 | 2 | 1 | 2 | 3 |
| | 6. pH adjuster*[1] | Appropriate amount | Appropriate amount | Appropriate amount | Appropriate amount | Appropriate amount |
| | 7. Purified water | Remnant | Remnant | Remnant | Remnant | Remnant |
| | Total | 100 | 100 | 100 | 100 | 100 |
| Evaluation | Evaluation of scattering intensity | AA | AA | C | C | C |
| | Evaluation of average number particle size | AA | AA | C | C | C |
| | Moisture retention (moisture) | AA | AA | A | C | C |
| | Irritation | A | A | A | C | C |

*[1]pH adjuster: lactic acid and sodium lactate

As shown in Table 9, it was confirmed for the lotions of the present invention that components 1 and 2 were added and dissolved in an aqueous solution to thereby generate fine bubbles (UFB), and that their bubbles were stably retained in water. It was also confirmed that the lotions of the present invention had less irritation and superior moisture retention compared with the comparative lotions, for which the generation of fine bubbles (UFB) was not confirmed.

Experimental Example 8: Preparation and Evaluation of Bath Additives

According to the formulation shown in Table 10, the components were powder-mixed and molded into powder or tablets according to a standard method, thereby preparing solid bath additives (bath additives 1 and 2 of the present invention and comparative bath additives 1 and 2).
(1) Evaluation of Generation of Ultrafine Bubbles
50 g of each of the prepared bath additives was put in 10 L of warm water (hardness: 100 mg/L) at 38° C. (pH: 8.2), and the generation of ultrafine bubbles was evaluated. Specifically, the warm water was left as it was, and after 12 hours, the scattering intensity and particle size were measured in the same manner as in Experimental Example 1, and evaluated according to the same criteria as in Experimental Example 1.
(2) Evaluation of Bathing Effects
50 g of each of the prepared bath additives was put in warm water (hardness: 100 mg/L) at 38° C. (pH: 8.2), and the bathing effects (body warmth and sustained warmth) were evaluated by three panelists.
(a) Warmth
After 50 g of each of the bath additives of the present invention or the comparative bath additives was put in bath water (150 L) at 38° C., the panelists were asked to immediately bathe for 10 minutes with the water up to their shoulders, and to evaluate the warmth immediately after bathing. The warmth was evaluated according to the following criteria in comparison with the warmth after similarly bathing in bath additive-free ordinary hot water at 38° C. for 10 minutes.
Evaluation of Warmth
AA: warmed much better than ordinary hot water
A: warmed better than ordinary hot water
B: warmed slightly better than ordinary hot water
C: warmed to the same degree as ordinary hot water
(b) Sustained Warmth
In a room at 24° C., 5 g of each of the bath additives of the present invention or the comparative bath additives was put in warm water (10 L) at 38° C. placed in a constant-temperature device, and then the panelists put both their feet in the water for 15 minutes. After 15 minutes, they took their feet out from the warm water, water droplets were wiped off, and their feet were left bare at room temperature for 20 minutes. Thereafter, the surface of the feet was photographed with thermography (Thermo Shot F30S: produced by Nippon Avionics Co., Ltd.). From the color of the captured screen, the sustained warmth on the skin surface was evaluated according to the following criteria.
Evaluation of Sustained Warmth
AA: The entire captured screen was red (the sustained warmth was evaluated as very excellent).
A: The entire captured screen was red and yellow (the sustained warmth was evaluated as good).
B: The entire captured screen was yellow (the sustained warmth was somewhat recognized).
C: Most of the captured screen was blue (the sustained warmth was the same as ordinary hot water).
Table 10 also shows the results.

TABLE 10

| | | Bath additive | | | parts by mass |
|---|---|---|---|---|---|
| | | Bath additive of the present invention | | Compartative bath additive | |
| | | 1 | 2 | 1 | 2 |
| Formulation | SL-containing composition 1 | 6 | 6 | 0 | 0 |
| | (A: acidic SL) | (2) | (2) | | |
| | (B: free fatty acid) | (0.16) | (0.16) | | |
| | Sodium hydrogen carbonate | 70 | 93 | 70 | 95 |
| | Sodium sulfate | 28 | 0 | 30 | 0 |
| | Fumaric acid | 0 | 5 | 0 | 5 |
| | Total | 100 | 100 | 100 | 100 |
| | Dosage form | Powder | Tablet | Powder | Tablet |
| Evaluation | Evaluation of scattering intensity | AA | AA | C | C |
| | Evaluation of average number particle size | AA | AA | C | C |
| | Warmth | AA | AA | A | A |
| | Sustained warmth | AA | AA | B | B |

As shown in Table 10, it was confirmed that the bath additives of the present invention were added and dissolved in warm water to thereby generate fine bubbles (UFB), and that their bubbles were stably retained in water. It was also confirmed that the bath additives of the present invention had superior warmth and sustained warmth compared with the comparative bath additives, for which the generation of fine bubbles (UFB) was not confirmed even when they were added to warm water.

Experimental Example 9: Preparation and Evaluation of Medical Device Detergents

According to the formulation shown in Table 11, the components were powder-mixed, and molded into powder or tablets according to a standard method, thereby preparing solid medical device detergents (medical device detergents 1 to 3 of the present invention and comparative medical device detergents 1 to 3).

0.5 g of each of the prepared medical device detergents was put in 100 mL of water (hardness: 100 mg/L) at 20° C. placed in a beaker (pH: 9.0), and the generation of ultrafine bubbles and detergency against blood stains were evaluated.

(1) Evaluation of Generation of Ultrafine Bubbles

Each medical device detergent was put in water and left. After 12 hours, the scattering intensity and average number particle size were measured in the same manner as in Experimental Example 1, and evaluated according to the same criteria as in Experimental Example 1.

(2) Evaluation of Detergency Against Blood Stains

Detergency was evaluated using a cleaning efficiency indicator (TOSI, produced by Pereg) stained with blood. The indicator was immersed in each medical device detergent. (medical device detergents 1 to 3 of the present invention and comparative medical device detergents 1 to 3) (20° C.) for 120 minutes. After immersion, the indicators were rinsed with running water for 30 seconds, dried, and visually observed. Indictors for which no stain could be confirmed were stained using Power Quick Residual Protein Detector (produced by Saraya Co., Ltd.). The degree of staining was visually observed again, and the detergency was evaluated according to the following criteria.

Detergency Evaluation

AA: No stain (without visualizing treatment) remained, and almost no stain was observed even after visualizing treatment.

A: Almost no stain (without visualizing treatment) remained, but some stains remained after visualizing treatment.

B: A few stains (without visualizing treatment) remained.

C: Many stains (without visualizing treatment) remained.

Table 11 also shows the results.

TABLE 11

| | Medical device detergent | Medical device detergent of the present invention | | | Comparative medical device detergent | | | parts by mass |
|---|---|---|---|---|---|---|---|---|
| | | 1 | 2 | 3 | 1 | 2 | 3 | |
| Formulation | SL-containing composition 1 | 6 | 30 | 6 | 0 | 0 | 0 | |
| | (A: acidic SL) | (2) | (10) | (2) | | | | |
| | (B: free fatty acid) | (0.16) | (0.8) | (0.16) | | | | |
| | Sodium linear alkylbenzene sulfonate | 0 | 0 | 0 | 0 | 2 | 2 | |
| | Sodium hydrogen carbonate | 73 | 65 | 58 | 73 | 73 | 58 | |
| | Potassium carbonate | 20 | 20 | 30 | 20 | 20 | 30 | |
| | Fumaric acid | 0 | 0 | 5 | 0 | 0 | 5 | |
| | Everlase 8.0T | 5 | 5 | 5 | 5 | 5 | 5 | |
| | Total | 100 | 100 | 100 | 100 | 100 | 100 | |
| | Dosage form | Powder | Powder | Tablet | Powder | Powder | Tablet | |
| Evaluation | Evaluation of scattering intensity | AA | AA | AA | C | C | C | |
| | Evaluation of average number particle size | AA | AA | AA | C | C | C | |
| | Detergency | AA | AA | AA | B | B | B | |

Everlase 8.0T (Novozymes)

As shown in Table 11, it was confirmed that the medical device detergents of the present invention were added and dissolved in water to thereby generate fine bubbles (UFB), and that their bubbles were stably retained in water. It was also confirmed that the medical device detergents of the present invention had superior detergency against blood stains compared with the comparative medical device detergents, for which the generation of fine bubbles (UFB) was not confirmed even when they were added to water.

Experimental Example 10: Preparation and Evaluation of Dishwash Detergents

According to the formulation shown in Table 12, the components were powder-mixed, and molded into powder or tablets according to a standard method, thereby preparing solid dishwash detergents (dishwash detergents 1 to 3 of the present invention and comparative dishwash detergents 1 to 3). 50 g of each of the prepared dishwash detergents was put in 10 L of water (hardness: 100 mg/L) at 40° C. (pH: 8.2) placed in an immersion tank, and the generation of ultrafine bubbles and detergency against starch were evaluated.

(1) Evaluation of Generation of Ultrafine Bubbles

Each dishwash detergent was put in water at 40° C. and left. After 12 hours, the scattering intensity and particle size were measured in the same manner as in Experimental Example 1, and evaluated according to the same criteria as in Experimental Example 1.

(2) Evaluation of Detergency Against Starch Stains

Packed rice (S&B Foods Inc.) was heated in a microwave oven, and about 100 g of the rice was spread over the center of a 19-cm-diameter porcelain dish. After leaving the rice for 10 minutes, it was removed from the dish, and the dish was dried at room temperature for 1 hour. Then, the dish was immersed in water (40° C.) in an immersion tank containing each of the dishwash detergents (dishwash detergents 1 to 3 of the present invention and comparative dishwash detergents 1 to 3) for 5 minutes. The dish was pulled up and immediately washed with hot water at 60° C. for 1 minute using a commercial dishwasher (ZANUSSI 520) and then dried. After drying, the entire inside of the dish was stained with an iodine solution. After staining, the degree of staining was visually observed to evaluate detergency.

Detergency Evaluation
  A: almost no stain (residual stain)
  B: a few stains (residual stains)
  C: many stains (residual stains)
Table 12 also shows the results.

a beaker (pH: 8.2 or 11.1), and the generation of ultrafine bubbles and detergency against artificially stained clothes were evaluated. Table 13 also shows the results.

(1) Evaluation of Generation of Ultrafine Bubbles

Each laundry detergent was put in warm water at 30° C. and left. After 12 hours, the scattering intensity and particle size were measured in the same manner as in Experimental Example 1, and evaluated according to the same criteria as in Experimental Example 1.

(2) Evaluation of Detergency Against Artificially Stained Cloth

Evaluation was performed using a wet artificially stained cloth modeling collar stains, and a tergotometer. 1 L of tap water was put in the test cup of the tergotometer (TM-8, produced by Daiei Kagaku Seiki Mfg. Co., Ltd.), and 5 g of each of the laundry detergents (laundry detergents 1 to 3 of

TABLE 12 parts by mass

| | Dishwash detergent | | | | | |
|---|---|---|---|---|---|---|
| | | Dishwash detergent of the present invention | | | Comparative dishwash detergent | | |
| | | 1 | 2 | 3 | 1 | 2 | 3 |
| Formulation | SL-containing composition 1 | 6 | 30 | 6 | 0 | 0 | 0 |
| | (A: acidic SL) | (2) | (10) | (2) | | | |
| | (B: free fatty acid) | (0.16) | (0.8) | (0.16) | | | |
| | Sodium alkyl ether sulfate | 0 | 0 | 0 | 0 | 2 | 2 |
| | Sodium hydrogen carbonate | 96.7 | 88.7 | 91.7 | 98.7 | 96.7 | 91.7 |
| | Fumaric add | 0 | 0 | 5 | 0 | 0 | 5 |
| | Potassium oleate | 0.5 | 0.5 | 0.5 | 0.5 | 0.5 | 0.5 |
| | Everlase 8.0T | 0.4 | 0.4 | 0.4 | 0.4 | 0.4 | 0.4 |
| | Termamyl 60T | 0.4 | 0.4 | 0.4 | 0.4 | 0.4 | 0.4 |
| | Total | 100 | 100 | 100 | 100 | 100 | 100 |
| | Dosage form | Powder | Powder | Tablet | Powder | Powder | Tablet |
| Evaluation | Evaluation of scattering intensity | AA | AA | AA | C | C | C |
| | Evaluation of average number particle size | AA | AA | AA | C | C | C |
| | Detergency | A | A | A | C | B | B |

Everlase 8.0T (Novozymes)
Termamyl 60T (Novozymes)

As shown in Table 12, it was confirmed that the dishwash detergents of the present invention were added and dissolved in water to thereby generate fine bubbles (UFB), and that the bubbles were stably retained in water. It was also confirmed that the dishwash detergents of the present invention had superior detergency, particularly detergency against starch stains, compared with the comparative dishwash detergents, for which the generation of fine bubbles (UFB) was not confirmed even when they were added to water.

Experimental Example 11: Preparation and Evaluation of Laundry Detergents

According to the formulation shown in Table 13, the components were powder-mixed, and molded into powder or tablets according to a standard method, thereby preparing solid laundry detergents (laundry detergents 1 to 3 of the present invention and comparative laundry detergents 1 to 3).

1 g of each of the prepared laundry detergents was put in 1 L of warm water (hardness: 100 mg/L) at 30° C. placed in the present invention and comparative laundry detergents 1 to 3) and the artificially stained cloth were put therein. The cloth was cleaned at 120 rpm and 30° C. for 10 minutes. Then, the cloth was rinsed with 1 L of tap water at 30° C. for 3 minutes, followed by water discharge twice. The cloth was lightly squeezed by hand and ironed to finish drying. Using a reflectometer (CM-600D, Minolta), the degree of whiteness of the stained cloth before and after cleaning was determined, and the cleaning rate was calculated by the following formula 3.

Cleaning rate (%)=(degree of whiteness of stained cloth after cleaning−degree of whiteness of stained cloth before cleaning)/(degree of whiteness of reference white cloth−degree of whiteness of stained cloth before cleaning)×100   Formula 3

Detergency Evaluation
  A: a cleaning rate of 60 or more
  B: a cleaning rate of 50% or more
  C: a cleaning rate of 40 or less.

Table 13 also shows the results.

TABLE 13

| | | Laundry detergent | | | | | |
|---|---|---|---|---|---|---|---|
| | | Laundry detergent of the present invention | | | Comparative laundry detergent | | |
| | | 1 | 2 | 3 | 1 | 2 | 3 |
| Formulation | SL-containing composition 1 | 6 | 6 | 6 | 0 | 0 | 0 |
| | (A: acidic SL) | (2) | (2) | (2) | | | |
| | (B: free fatty acid) | (0.16) | (0.16) | (0.16) | | | |
| | Sodium hydrogen carbonate | 97.2 | 0 | 92.2 | 99.2 | 0 | 94.2 |
| | Sodium carbonate | 0 | 97.2 | 0 | 0 | 99.2 | 0 |
| | Fumaric acid | 0 | 0 | 5 | 0 | 0 | 5 |
| | Everlase 8.0T | 0.5 | 0.5 | 0.5 | 0.5 | 0.5 | 0.5 |
| | Liporase 100T | 0.1 | 0.1 | 0.1 | 0.1 | 0.1 | 0.1 |
| | Termamyl 60T | 0.1 | 0.1 | 0.1 | 0.1 | 0.1 | 0.1 |
| | Carezyme 900T | 0.1 | 0.1 | 0.1 | 0.1 | 0.1 | 0.1 |
| | Total | 100 | 100 | 100 | 100 | 100 | 100 |
| | Dosage form | Powder | Powder | Tablet | Powder | Powder | Tablet |
| | pH | 8.2 | 11.1 | 8.2 | 8.2 | 11.1 | 8.2 |
| Evaluation | Evaluation of scattering intensity | AA | A | AA | C | C | C |
| | Evaluation of average number particle size | AA | AA | AA | C | C | C |
| | Detergency | A | A | A | C | B | C |

Evertase 8.0T (Novozymes)
Liporase 100T (Novozymes)
Termamyl 60T (Novozymes)
Carezyme 900T (Novozymes)

As shown in Table 13, it was confirmed that the laundry detergents of present invention were added and dissolved in warm water to thereby generate fine bubbles (UFB), and that the bubbles were stably retained in water. It was also confirmed that the laundry detergents of the present invention had superior detergency against collar stains compared with the comparative laundry detergents, for which the generation of fine bubbles (UFB) was not confirmed even when they were added to warm water.

Experimental Example 12: Stability of Fine Bubbles Consisting of $CO_2$ Gas

A stability test was carried out using test sample 1-2 (see Table 1) shown in Experimental Example 1.

Specifically, after the components were mixed so that the final concentration in water satisfied the ratio (final concentration:mass) shown in Table 1 (test sample 1-2), the resulting mixture was added to 1 L of tap water (hardness: 100 mg/L) (room temperature) placed in a glass beaker, and dissolved by stirring with a stir bar and a stirrer (pH: 8.2), and the components were allowed to react (generation of $CO_2$ gas).

The resultant was placed in a 50-mL glass bottle, and stored at room temperature in the dark for 1 month, 6 months, and 12 months. Then, the scattering intensity and particle size were measured in the same manner as in Experimental Example 1.

Table 14 shows the results. The evaluation results shown in Table 14 are based on the same criteria as in Experimental Example 1.

TABLE 14

| | | Test sample 1-2 | | |
|---|---|---|---|---|
| | Storage period | After 1 month | After 6 months | After 1 year |
| Evaluation | Generated gas | $CO_2$ | $CO_2$ | $CO_2$ |
| | Scattering intensity: cps (evaluation) | 53864 AA | 55191 AA | 54673 AA |
| | Average number particle size: nm (evaluation) | 150.8 AA | 146.8 AA | 160.4 AA |

As shown in Table 14, the scattering intensity and average number particle size were both stable over a period of time as long as a year. This confirmed that fine bubbles (UFB) generated in water by the method of the present invention were stably retained in water over a long period of time.

Experimental Example 13: Measurement of Dynamic Surface Tension

SL or each of the various surfactants shown in Tables 15 and 16 was used as a surfactant, $CO_2$ gas was generated in water in the same manner as in Experimental Example 1, and the generated bubbles were evaluated. Further, the dynamic surface tension of the prepared aqueous solution was measured over time, and the relationship between the state of the generated bubbles and the dynamic surface tension was examined.

Figure 1:
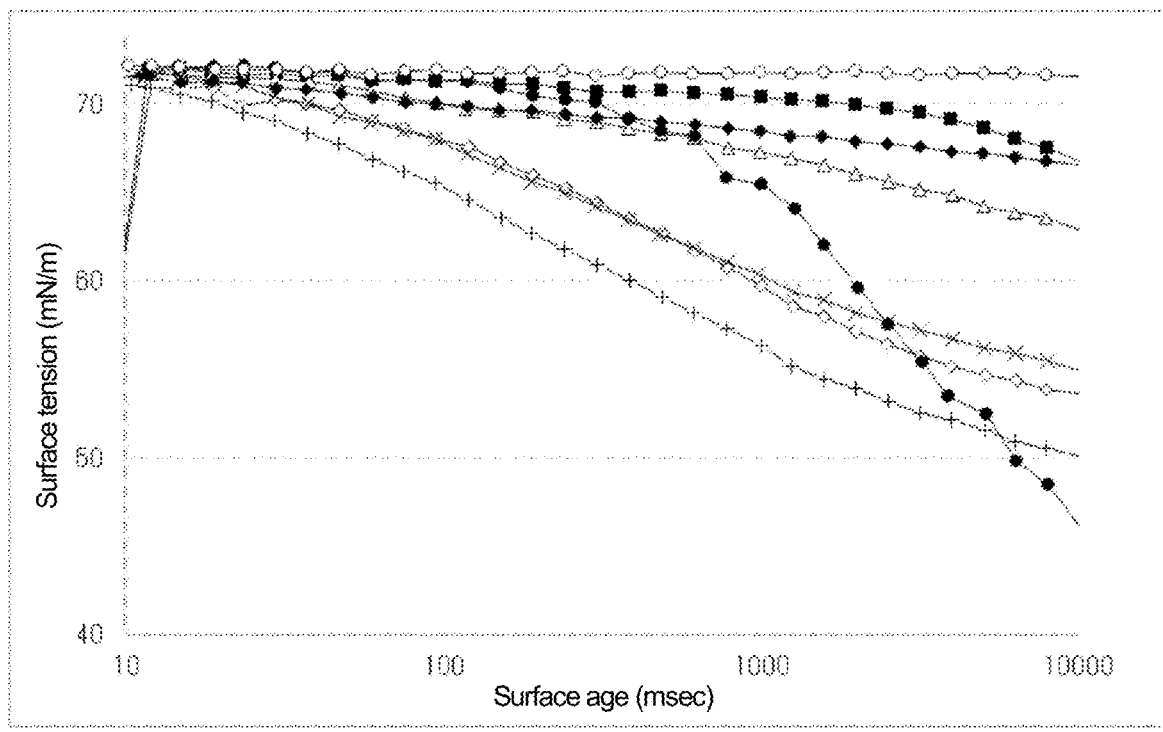
FIG. 1 shows the results of Experimental Example 13, which was performed with a surfactant concentration of 0.01 mass. The relationship between each line in FIG. 1 and the surfactant used is as follows (the same applies to FIG. 2)

The starting materials for the surfactants used in Experimental Example 13 are as follows. The symbols of the lines in FIGS. 1 and 2 are shown in parentheses.

Test samples 13-A1 and B1: SL-containing composition 1: same as Experimental Example 1 (-■-)
Test samples 13-A2 and B2: sodium alkyl polyoxyethylene sulfate: Taycapol NE1230 (produced by Tayca Corporation)(-Δ-)

Test samples 13-A3 and B3: dimethyldidecylammonium chloride: Cation DDC-80T (produced by Sanyo Chemical Industries, Ltd.) (-◇-)

Test samples 13-A4 and B4: benzalkonium chloride: Albumin 1214 (produced by Taiwan Surfactant) (-◆-)

Test samples 13-A5 and B5: lauryl dimethylaminoacetic acid betaine: Rikabion A-100 (produced by New Japan Chemical Co., Ltd.) (-×-)

Test samples 13-A6 and B6: lauryl dimethylamine oxide: Amphitol 20N (produced by Kao Corporation) (-+-)

Test samples 13-A7 and B7: POE lauryl ether: Emulgen 103 (produced by Kao Corporation) (-●-)

Test samples 13-A8 and B8: POE stearyl ether (6EO): Emulgen 306 (produced by Kao Corporation) (-○-)

(1) Preparation of Test Samples

After the components were added so that the final concentration in water satisfied the ratio (mass %) shown in Tables 15 and 16, the resulting mixture was added to 1 L of tap water (hardness: 100 mg/L) (room temperature) placed in a glass beaker, and dissolved by stirring with a stir bar and a stirrer (pH: 8.2), and the components were allowed to react (generation of $CO_2$ gas).

(2) Measurement of Scattering Intensity and Particle Size of Bubbles

The test samples prepared above were each left at room temperature, and after 12 hours, the scattering intensity and particle size were measured in the same manner as in Experimental Example 1. The scattering intensity was calculated by subtracting the scattering intensity of an aqueous solution in which SL-containing composition 1 or each surfactant was dissolved (control sample 1) and the scattering intensity of an aqueous solution in which component C was dissolved (control sample 2) from the scattering intensity of an aqueous solution in which all of the components were dissolved (test sample), as shown in formula 2 above.

(3) Measurement of Dynamic Surface Tension

The dynamic surface tension of the surfactants used in the preparation of the test samples was measured. For the measurement of dynamic surface tension, a bubble pressure dynamic surface tensiometer (BP-100: produced by KURSS) was used. Specifically, an aqueous solution of each surfactant (0.01% and 0.05%) was placed in a dedicated Petri dish, and subjected to dynamic surface tension under the following conditions. Surface age means the time from the beginning of the formation of the interface to the maximum pressure.

Measurement temperature: 25° C.,

Surface age: 10 msec to 10000 msec.

Table 15 and FIG. 1 show the results when the surfactant concentration was 0.01%, and Table 16 and FIG. 2 show the results when the surfactant concentration was 0.05%.

TABLE 15

Table 15 Surfactant concentration: 0.01%

| | Surfactant type | Component | Test sample 13 | | | | | | | |
|---|---|---|---|---|---|---|---|---|---|---|
| | | | A1 | A2 | A3 | A4 | A5 | A6 | A7 | A8 |
| A&B | Anionic | SL-containing composition 1 (A: acidic SL) (B: free fatty acid) | 0.03 (0.01) (0.0008) | 0 | 0 | 0 | 0 | 0 | 0 | 0 |
| Surfactant | Anionic | Sodium alkyl polyoxyethylene sulfate | 0 | 0.01 | 0 | 0 | 0 | 0 | 0 | 0 |
| | Cationic | Dimethyldidecylammonium chloride | 0 | 0 | 0.01 | 0 | 0 | 0 | 0 | 0 |
| | | Benzalkonium chloride | 0 | 0 | 0 | 0.01 | 0 | 0 | 0 | 0 |
| | Amphoteric | Lauryl dimethylaminoacetic acid betaine | 0 | 0 | 0 | 0 | 0.01 | 0 | 0 | 0 |
| | | Lauryl dimethylamine oxide | 0 | 0 | 0 | 0 | 0 | 0.01 | 0 | 0 |
| | Nonionic | POE lauryl ether | 0 | 0 | 0 | 0 | 0 | 0 | 0.01 | 0 |
| | | POE stearyl ether (6EO) | 0 | 0 | 0 | 0 | 0 | 0 | 0 | 0.01 |
| C | | Sodium hydrogen carbonate | 0.49 | 0.49 | 0.49 | 0.49 | 0.49 | 0.49 | 0.49 | 0.49 |
| Evaluation | Dynamic surface tension (surface age) | 100 msec | 71.2 | 70 | 67.9 | 70 | 67.9 | 66.3 | 71.3 | 71.9 |
| | | 1000 msec | 70.3 | 67.3 | 59.7 | 68.4 | 60.4 | 56.5 | 65.5 | 71.8 |
| | | 10000 mse | 67.2 | 62.8 | 53.8 | 66.7 | 53.7 | 50.4 | 45.9 | 71.8 |
| | | Scattering intensity: cps (evaluation) | 52923 (AA) | 2021 (C) | 3017 (C) | 0 | 0 | 0 | 0 | 0 |
| | | Average number particle size: nm (evaluation) | 135.2 (AA) | — | — | — | — | — | — | — |

TABLE 16

Table 16 Surfactant concentration: 0.05%

| | Surfactant type | Component | Test sample 13 | | | | | | | |
|---|---|---|---|---|---|---|---|---|---|---|
| | | | B1 | B2 | B3 | B4 | B5 | B6 | B7 | B8 |
| A&B | Anionic | SL-containing composition 1 (A: acidic SL) (B: free fatty acid) | 0.15 (0.05) (0.004) | 0 | 0 | 0 | 0 | 0 | 0 | 0 |
| Surfactant | Anionic | Sodium alkyl polyoxyethylene sulfate | 0 | 0.05 | 0 | 0 | 0 | 0 | 0 | 0 |
| | Cationic | Dimethyididecylammonium chloride | 0 | 0 | 0.05 | 0 | 0 | 0 | 0 | 0 |
| | | Benzalkonium chloride | 0 | 0 | 0 | 0.05 | 0 | 0 | 0 | 0 |

TABLE 16-continued

Table 16 Surfactant concentration: 0.05%

| | | Test sample 13 | | | | | | | |
|---|---|---|---|---|---|---|---|---|---|
| Surfactant type | Component | B1 | B2 | B3 | B4 | B5 | B6 | B7 | B8 |
| Amphoteric | Lauryl dimethylaminoacetic acid betaine | 0 | 0 | 0 | 0 | 0.05 | 0 | 0 | 0 |
| | Lauryl dimethylamine oxide | 0 | 0 | 0 | 0 | 0 | 0.05 | 0 | 0 |
| Non-ionic | POE lauryl ether | 0 | 0 | 0 | 0 | 0 | 0 | 0.05 | 0 |
| | POE stearyl ether (6EO) | 0 | 0 | 0 | 0 | 0 | 0 | 0 | 0.05 |
| C | Sodium hydrogen carbonate | 0.49 | 0.49 | 0.49 | 0.49 | 0.49 | 0.49 | 0.49 | 0.49 |
| Dynamic surface tension (surface age) | 100 msec | 68.7 | 60.7 | 59.8 | 58.9 | 48.1 | 43.3 | 68.4 | 70.8 |
| | 1000 msec | 65.7 | 53.2 | 36.3 | 53.7 | 42.2 | 37.2 | 56.4 | 70.8 |
| | 10000 mse | 61 | 46.5 | 34 | 51.2 | 39.6 | 32.6 | 37.5 | 70.8 |
| Scattering intensity: cps (evaluation) | | 52923 (AA) | 2021 (C) | 3017 (C) | 0 | 0 | 0 | 0 | 0 |
| Average number particle size: nm (evaluation) | | 135.2 (AA) | — | — | — | — | — | — | — |

As shown in Tables 15 and 16, as well as FIGS. 1 and 2, it was confirmed that hydrogen carbonate was allowed to coexist with each surfactant in water to thereby generate $CO_2$ gas; however, from the scattering intensity and particle size, the generation of ultrafine bubbles (UFB) after 12 hours was confirmed only for test samples 13-A1 and 13-B1 (-■- in each figure), which used the SL-containing composition. It was confirmed that their surface tension decreased more slowly than the surface tension of test samples 13-A2 to 7 and 13-B2 to 7, which used surfactants other than POE stearyl ether, and that they were easily absorbed into water. Specifically, the surface tension of test sample 13-A1 (SL concentration: 0.01%) was kept at 70 mN/m or more even after 1 second; however, the surface tension of test samples 13-A2 to 7 decreased to less than 70 mN/m. Further, the surface tension of test sample 13-B1 (SL concentration: 0.05%) was kept at 60 mN/m or more even after 10 seconds; however, the surface tension of test samples 13-B2 to 7 significantly decreased to less than 60 mN/m.

On the other hand, test samples 13-A8 and B8 (-○- in each figure), which used POE stearyl ether (6EO) as a surfactant, did not generate ultrafine bubbles (UFB), even though their dynamic surface tension decreased slowly. The reason for this is, for example, that POE stearyl ether (6EO) is a nonionic surfactant.

Fine bubbles generated from the gas generation component targeted by the present invention have a negative charge. Therefore, substances with a positive charge gather around them to form a positive/negative electric double layer. Due to its negative charge in the hydrophilic group, SL is considered to be attracted to the positive charge of the electric double layer of the fine bubbles and adsorbed to the fine bubbles for stabilization. On the other hand, due to no charge in the hydrophilic group, POE stearyl ether (6EO) is considered to be not attracted to the electric double layer of the fine bubbles and not adsorbed to the fine bubbles. From these results, although it is not limited, the generation of fine bubbles in water and their stability (retention) are considered to be affected by the surface tension characteristics (anionicity and slow dynamic surface tension) of the SL-containing composition.

The invention claimed is:

1. An ultrafine bubble generator comprising a combination of the following (A), (B), and (C):
    (A) a sophorolipid containing acidic sophorolipid and lactonic sophorolipid in a ratio (mass ratio) of 78:22 to 100:0,
    (B) a free fatty acid or salt thereof, and
    (C) a gas generation component,
    wherein ultrafine bubbles are generated by adding (A), (B), and (C) to water to allow (A), (B), and (C) to coexist in the water under atmospheric pressure conditions without introducing gas from outside, and
    the ultrafine bubbles have an average number particle size of 50 nm or more and less than 1000 nm as measured with a dynamic light scattering spectrophotometer.

2. The ultrafine bubble generator according to claim 1, wherein (C) is at least one member selected from the group consisting of carbon dioxide gas generation components, oxygen gas generation components, hydrogen gas generation components, and chlorine gas generation components.

3. The ultrafine bubble generator according to claim 2, wherein the carbon dioxide gas generation component is a carbonate or hydrogen carbonate, or a combination with its counterpart; the oxygen gas generation component is a hydrogen peroxide or a combination with its counterpart; the hydrogen gas generation component is a hydrogenated salt, boron hydrogenated salt, or hydrochloric acid, or a combination with its counterpart; or the chlorine gas generation component is a hypochlorite or a combination with its counterpart.

4. The ultrafine bubble generator according to claim 1, which is a composition of (A), (B), and (C), or a product combination in which at least (C) is packaged separately from (A) and (B).

5. The ultrafine bubble generator according to claim 1, which is a detergent, bath additive, cosmetic, mouthwash, gargle, texture improver, food or drink, plant growth promoter, seafood growth promoter, or disinfectant.

6. The ultrafine bubble generator according to claim 1, wherein the water has a hardness of 30 to 200 mg/L.

* * * * *